United States Patent
Canipe et al.

(10) Patent No.: US 12,364,210 B2
(45) Date of Patent: Jul. 22, 2025

(54) METHOD AND APPARATUS FOR HIGH-DENSITY INDOOR FARMING

(71) Applicant: 80 ACRES URBAN AGRICULTURE INC., Hamilton, OH (US)

(72) Inventors: Tracy Alan Canipe, Hickory, NC (US); Michael Zelkind, Cincinnati, OH (US); Patricia Livingston, Cincinnati, OH (US)

(73) Assignee: 80 ACRES URBAN AGRICULTURE, INC., Hamilton, OH (US)

( * ) Notice: Subject to any disclaimer, the term of this patent is extended or adjusted under 35 U.S.C. 154(b) by 115 days.

(21) Appl. No.: 18/302,524

(22) Filed: Apr. 18, 2023

(65) Prior Publication Data

US 2023/0270053 A1 Aug. 31, 2023

Related U.S. Application Data

(63) Continuation of application No. 16/870,675, filed on May 8, 2020, now Pat. No. 11,672,209.
(Continued)

(51) Int. Cl.
*A01G 9/24* (2006.01)
*A01G 9/18* (2006.01)
(Continued)

(52) U.S. Cl.
CPC ............. *A01G 9/246* (2013.01); *A01G 9/18* (2013.01); *A01G 9/20* (2013.01); *A01G 9/247* (2013.01); *A01G 9/249* (2019.05); *B25J 9/1679* (2013.01)

(58) Field of Classification Search
CPC ........ A01G 31/045; A01G 31/04; A01G 9/18; A01G 9/246; A01G 9/143
See application file for complete search history.

(56) References Cited

U.S. PATENT DOCUMENTS 3,012,493 A 12/1961 Ekeren
3,033,097 A 5/1962 Phillips
(Continued)

FOREIGN PATENT DOCUMENTS

BE 901370 A 4/1985
CN 102528997 A 7/2012
(Continued)

OTHER PUBLICATIONS

Extended European Search Report for European Patent Application No. 20805584.8 issued Apr. 21, 2023, 7 pages.
(Continued)

*Primary Examiner* — Monica L Perry
(74) *Attorney, Agent, or Firm* — Duane Morris LLP

(57) ABSTRACT

The present disclosure relates to a module and system for indoor farming. In some embodiments, an indoor farming module includes a container compartment divided into a grow zone and a control zone, wherein a grow zone comprises a chassis with a plurality of horizontal and vertical frame members configured to support a plurality of carts each carrying a tray with a plurality of plants and wherein the control zone includes an air blowing unit integrated so as to direct air between a drop ceiling and a structural ceiling of the indoor farming module and an air conditioning unit configured to condition an atmosphere in the grow zone by producing cool dry air that is blown into a plenum space located between the drop ceiling and a structural ceiling.

22 Claims, 30 Drawing Sheets

Related U.S. Application Data

(60) Provisional application No. 62/845,822, filed on May 9, 2019.

(51) Int. Cl.
*A01G 9/20* (2006.01)
*B25J 9/16* (2006.01)

(56) References Cited

U.S. PATENT DOCUMENTS

| | | | |
|---|---|---|---|
| 4,292,762 A | 10/1981 | Fogg et al. | |
| 6,578,317 B1 | 6/2003 | Ahm | |
| 8,782,948 B2 | 7/2014 | Harwood | |
| 8,984,806 B2 | 3/2015 | Uchiyama | |
| D731,917 S | 6/2015 | Stroot | |
| 9,763,382 B2 | 9/2017 | Stroot et al. | |
| 9,854,750 B2 | 1/2018 | Brusatore | |
| 9,974,252 B2 | 5/2018 | Aykroyd et al. | |
| 10,076,090 B2 | 9/2018 | Joseph et al. | |
| 10,104,845 B2 | 10/2018 | Cohen et al. | |
| 10,182,537 B1 | 1/2019 | Buelow | |
| 10,306,847 B2 | 6/2019 | Whitcher et al. | |
| D853,886 S | 7/2019 | Galonska et al. | |
| 10,506,770 B2 | 12/2019 | Galonska et al. | |
| 10,542,685 B2 | 1/2020 | Buelow | |
| 10,750,672 B2 | 8/2020 | Buelow | |
| 10,765,069 B2 | 9/2020 | Werner et al. | |
| 10,801,147 B2 | 10/2020 | Harwood | |
| 10,918,021 B1 | 2/2021 | Chen et al. | |
| 10,939,623 B2 | 3/2021 | Miyahara et al. | |
| 11,301,986 B2 | 4/2022 | Liu | |
| 11,388,863 B2 | 7/2022 | Hunter et al. | |
| 11,483,981 B1 | 11/2022 | Lo et al. | |
| 11,483,988 B2 | 11/2022 | Bertram et al. | |
| 2004/0163308 A1 | 8/2004 | Uchiyama | |
| 2004/0194371 A1 | 10/2004 | Kinnis | |
| 2006/0272210 A1 | 12/2006 | Bissonnette et al. | |
| 2011/0041395 A1 | 2/2011 | Newbold et al. | |
| 2011/0120002 A1 | 5/2011 | Pettibone | |
| 2013/0255146 A1 | 10/2013 | Lehman et al. | |
| 2013/0333286 A1 | 12/2013 | Billingsley | |
| 2014/0115958 A1 | 5/2014 | Helene et al. | |
| 2014/0137471 A1 | 5/2014 | Harwood | |
| 2014/0231044 A1 | 8/2014 | Duchesne et al. | |
| 2015/0005964 A1 | 1/2015 | Liotta | |
| 2015/0282440 A1 | 10/2015 | Shelor | |
| 2016/0000021 A1 | 1/2016 | Sugimoto | |
| 2016/0014977 A1 | 1/2016 | Esaki et al. | |
| 2016/0050862 A1 | 2/2016 | Walliser | |
| 2016/0148104 A1 | 5/2016 | Itzhaky et al. | |
| 2016/0288991 A1 | 10/2016 | Richardson | |
| 2016/0360712 A1 | 12/2016 | Yorio et al. | |
| 2017/0027112 A1 | 2/2017 | Vail et al. | |
| 2017/0038749 A1 | 2/2017 | Mewes et al. | |
| 2017/0118922 A1 | 5/2017 | Sherertz | |
| 2017/0142912 A1 | 5/2017 | Gasmer et al. | |
| 2017/0231175 A1 | 8/2017 | Galonska et al. | |
| 2017/0273256 A1 | 9/2017 | Hutzel | |
| 2017/0332544 A1 | 11/2017 | Conrad et al. | |
| 2017/0339846 A1 | 11/2017 | Lawrence et al. | |
| 2018/0007845 A1 | 1/2018 | Martin | |
| 2018/0014469 A1 | 1/2018 | Buelow | |
| 2018/0014486 A1 | 1/2018 | Creechley et al. | |
| 2018/0035625 A1 | 2/2018 | Lindbo et al. | |
| 2018/0125016 A1 | 5/2018 | Dufresne | |
| 2018/0132441 A1 | 5/2018 | Harker et al. | |
| 2018/0168111 A1 | 6/2018 | Yasukuri | |
| 2018/0213735 A1 | 8/2018 | Vail et al. | |
| 2018/0235156 A1 | 8/2018 | Blair et al. | |
| 2018/0308028 A1 | 10/2018 | Zhang et al. | |
| 2018/0343810 A1 | 12/2018 | Counne | |
| 2018/0359937 A1 | 12/2018 | Millar | |
| 2018/0359947 A1 | 12/2018 | Millar et al. | |
| 2019/0082620 A1 | 3/2019 | Griffin | |
| 2019/0133026 A1 | 5/2019 | Seaman et al. | |
| 2019/0141911 A1 | 5/2019 | Nguyen et al. | |
| 2019/0230876 A1 | 8/2019 | Lysaa | |
| 2019/0259108 A1 | 8/2019 | Bongartz et al. | |
| 2019/0285287 A1 | 9/2019 | Kimura et al. | |
| 2019/0313588 A1 | 10/2019 | Zimmerman | |
| 2019/0323253 A1 | 10/2019 | Benvie | |
| 2019/0335676 A1 | 11/2019 | Solomon et al. | |
| 2019/0338965 A1 | 11/2019 | O'Brian | |
| 2019/0380283 A1 | 12/2019 | Chong | |
| 2020/0093069 A1 | 3/2020 | Meews et al. | |
| 2020/0214226 A1 | 7/2020 | Yukawa | |
| 2020/0214228 A1 | 7/2020 | Cho et al. | |
| 2020/0236871 A1 | 7/2020 | Travaglini | |
| 2020/0260673 A1 | 8/2020 | Travaglini | |
| 2020/0352113 A1 | 11/2020 | Canipe et al. | |
| 2020/0359570 A1* | 11/2020 | Portello | A01G 9/247 |
| 2021/0100173 A1 | 4/2021 | Khwaja et al. | |
| 2021/0137022 A1 | 5/2021 | Fuse et al. | |
| 2021/0137028 A1 | 5/2021 | Zelkind et al. | |
| 2021/0352853 A1 | 11/2021 | Day et al. | |
| 2022/0007589 A1 | 1/2022 | Binney et al. | |
| 2023/0118404 A1 | 4/2023 | Livingston et al. | |
| 2023/0232760 A1 | 7/2023 | DeshPande | |
| 2023/0301254 A1 | 9/2023 | DeshPande et al. | |

FOREIGN PATENT DOCUMENTS

| | | |
|---|---|---|
| CN | 106561347 B | 12/2019 |
| DE | 4313581 A1 | 10/1994 |
| EP | 3076782 A1 | 10/2016 |
| EP | 3326452 A1 | 5/2018 |
| EP | 3837967 A1 | 6/2021 |
| GB | 2152205 A | 7/1985 |
| GB | 2550319 B | 2/2021 |
| JP | H0672344 U | 10/1994 |
| JP | H0923762 A | 1/1997 |
| JP | H09262027 A | 10/1997 |
| JP | 2001016981 A | 1/2001 |
| JP | 2001161185 A | 6/2001 |
| JP | 2004065265 A | 3/2004 |
| JP | 2006252105 A | 9/2006 |
| JP | 2007209252 A | 8/2007 |
| JP | 3156190 U | 12/2009 |
| JP | 2015500040 A | 1/2015 |
| JP | 2015501157 A | 1/2015 |
| JP | 2015213491 A | 12/2015 |
| JP | 2018023344 A | 2/2018 |
| JP | 2019514145 A | 5/2019 |
| KR | 101690113 B1 | 1/2017 |
| KR | 102069121 B1 | 1/2020 |
| WO | 2003041489 A1 | 5/2003 |
| WO | 2005079557 A1 | 9/2005 |
| WO | 2011117437 A1 | 9/2011 |
| WO | 2012005121 A1 | 1/2012 |
| WO | 2013113096 A1 | 8/2013 |
| WO | 2014128746 A1 | 8/2014 |
| WO | 2016166311 A1 | 10/2016 |
| WO | 2017062918 A1 | 10/2016 |
| WO | 2016205634 A1 | 12/2016 |
| WO | 2017024353 A1 | 2/2017 |
| WO | 2017026390 A1 | 2/2017 |
| WO | 2017191819 A1 | 11/2017 |
| WO | 2017205523 A1 | 11/2017 |
| WO | 2018010946 A1 | 1/2018 |
| WO | 2018035314 A1 | 2/2018 |
| WO | 2018136008 A1 | 7/2018 |
| WO | 2018147728 A1 | 8/2018 |
| WO | 2019056057 A1 | 3/2019 |
| WO | 2019183734 A1 | 3/2019 |
| WO | 2019077569 A1 | 4/2019 |
| WO | 2019077571 A1 | 4/2019 |
| WO | 2017208906 A1 | 5/2019 |
| WO | 2019089800 A1 | 5/2019 |
| WO | 2019173876 A1 | 9/2019 |
| WO | 2019176070 A1 | 9/2019 |
| WO | 2019183244 A1 | 9/2019 |
| WO | 2020005317 A1 | 1/2020 |
| WO | 2020041762 A1 | 2/2020 |
| WO | 2020076735 A1 | 4/2020 |

(56) References Cited

FOREIGN PATENT DOCUMENTS

| WO | 2020089479 | A1 | 5/2020 |
|----|-----------|----|--------|
| WO | 2020092503 | A1 | 5/2020 |
| WO | 2020092506 | A1 | 5/2020 |
| WO | 2020112610 | A1 | 6/2020 |
| WO | 2020132634 | A1 | 6/2020 |
| WO | 2021037901 | A1 | 8/2020 |
| WO | 2021055257 | A1 | 3/2021 |
| WO | 2021072550 | A1 | 4/2021 |
| WO | 2021202827 | A1 | 10/2021 |
| WO | 2021219837 | A1 | 11/2021 |

OTHER PUBLICATIONS

Partial European Search Report for European Patent Application No. 20802692.2 dated Dec. 20, 2022, 16 pages.
U.S. Appl. No. 13/123,942, filed Apr. 13, 2011, Van Gemert et al.
AVF+ Product Description, "AVF+ Vertical Farming," Artechno Growsystems, Pastoor Verburghlaan 20a, 2678 NE, De Lier, The Netherlands, 2018, 8 pages.
International Search Report and Written Opinion in International Patent Application No. PCT/US20/32719, dated Sep. 1, 2020, in 15 pages.
International Search Report and Written Opinion in International Patent Application No. PCT/US20/60609, dated Feb. 11, 2021, in 14 pages.
International Search Report and Written Opinion in International Patent Application No. PCT/US20/32218, dated Jul. 30, 2020, in 11 pages.
Extended European Search Report for European Patent Application No. 20802692.2 dated Mar. 27, 2023, 14 pages.
International Search Report and Written Opinion issued for PCT International Application No. PCT/US2024/046202 dated Feb. 25, 2025.

* cited by examiner

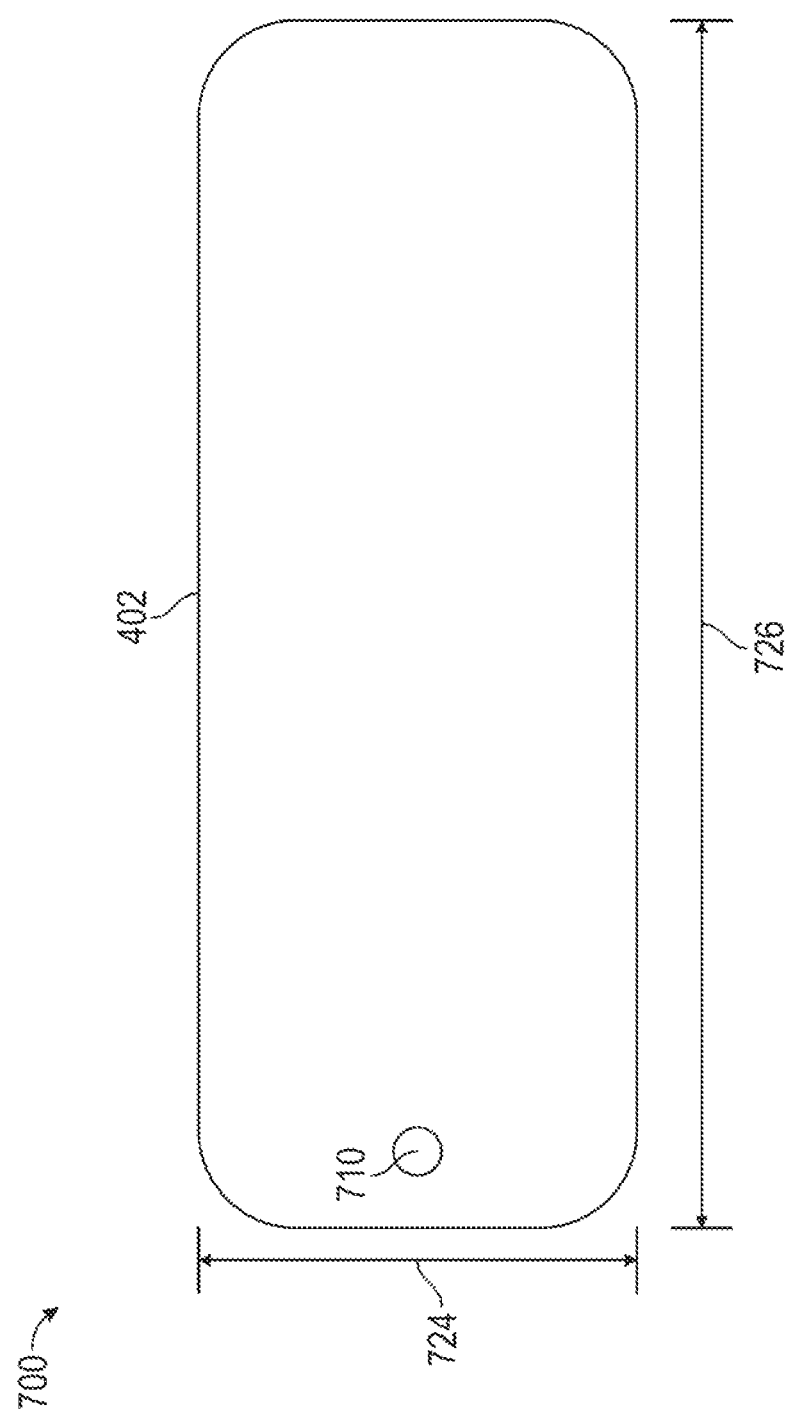

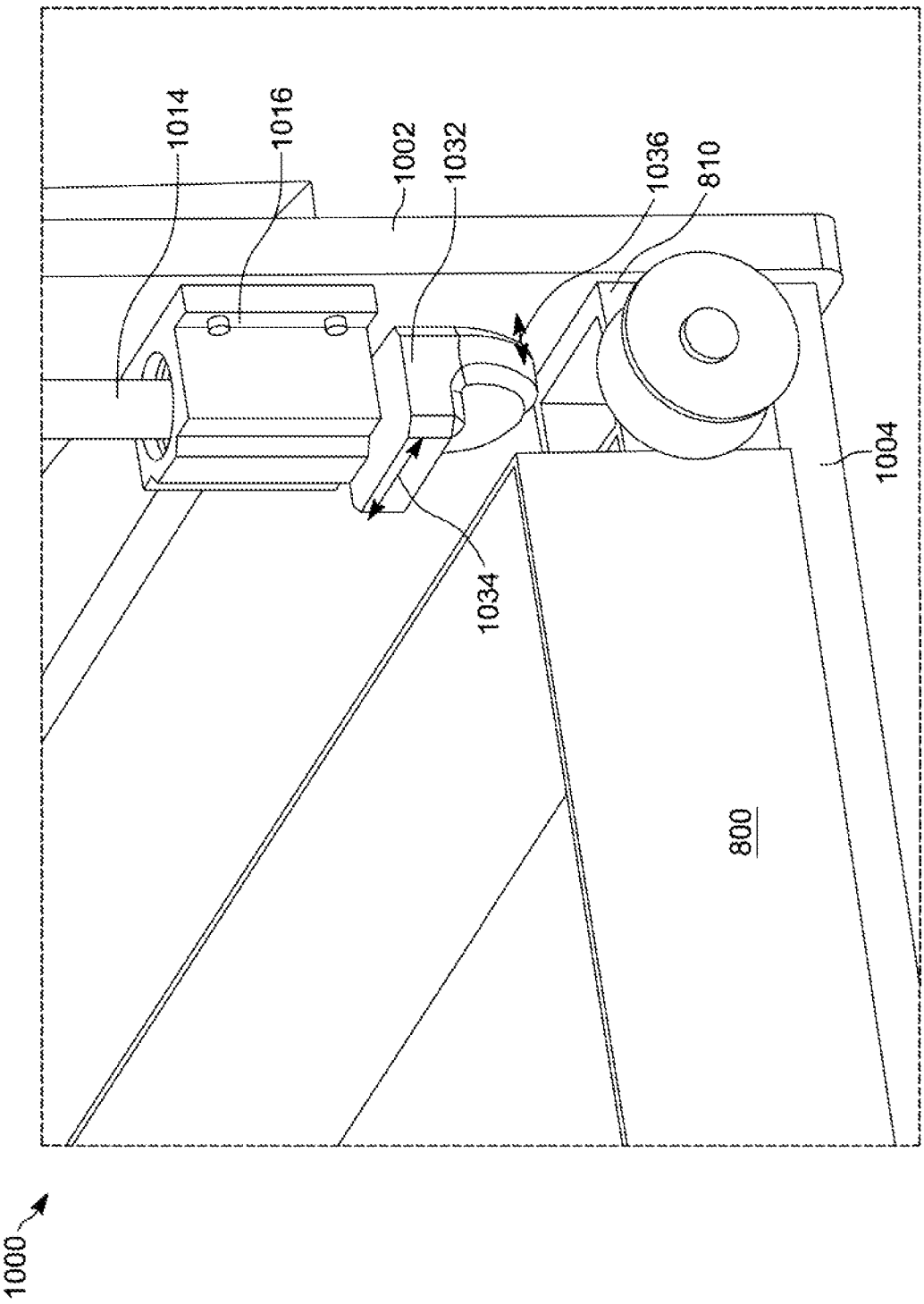

US 12,364,210 B2

METHOD AND APPARATUS FOR HIGH-DENSITY INDOOR FARMING

This application claims the benefit of and is a continuation patent application of U.S. patent application Ser. No. 16/870,675, filed on May 8, 2020 that claims the benefit of U.S. Provisional Patent Application No. 62/845,822, filed May 9, 2019. Each of these applications is incorporated by reference herein in its entirety.

TECHNICAL FIELD

This disclosure relates generally to indoor farming systems and, more particularly, to a method and apparatus for indoor farming using a high-density indoor farming module.

BACKGROUND

Global food production systems need to address significant challenges in the coming decades. Finding ways to feed a growing global population whilst reducing environmental impact of agricultural activities is of critical importance. Controlled environment agriculture (CEA), which includes greenhouses and indoor farming, offers a realistic alternative to conventional production for some crops. Vertical indoor farming allows for faster, more controlled production, irrespective of season. Further, vertical indoor farming is not vulnerable to other environmental variability such as pests, pollution, heavy metals, and pathogens. Vertical indoor farming can also reduce environmental impact offering no loss of nutrient, reduced land requirement, better control of waste, less production loss, reduced transportation cost, and reduced clean water usage. Therefore, vertical indoor farming can help to address the significant challenges.

Current methods and systems for vertical indoor farming, however, are relatively expensive to implement and do not efficiently utilize the available space within a room or container for growing crops. For example, to implement an indoor farming system, an enclosed room or container must be provided and thereafter configured for growing crops or plants in a controllable environment. Environmental parameters such as lighting, temperature, humidity and airflow are controllable within the room or container to achieve the benefits of indoor farming discussed above. Such environmental control, however, requires relatively expensive sensor and control systems. Additionally, shelving and/or racks for holding the plants must be placed within the room or container, and for rooms or containers having a relatively large size, space is allocated within the room or container for allowing human operators to walk inside the enclosed room or container to access each of the shelves and/or racks. Thus, much of the space within the room or container is not allocated for growing plants but instead for allowing human access and movement within the room or container. This is an inefficient utilization of valuable and limited space within an enclosed room or container for growing plants/crops. Therefore, current methods and systems for indoor farming are not satisfactory.

BRIEF DESCRIPTION OF THE DRAWINGS

Aspects of the invention are best understood from the following detailed description when read with the accompanying figures. It is noted that various features are not necessarily drawn to scale. In fact, the dimensions and geometries of the various features may be arbitrarily increased or reduced for clarity of illustration.

FIGS. 7A-7B illustrate a tray drain insert, in accordance with some embodiments of the invention.

FIG. 10A-10F illustrate exemplary perspective views of an attachment 1000 for an articulated robot in a tray-handling system 900, in accordance with some embodiments of the invention.

DETAILED DESCRIPTION OF EXEMPLARY EMBODIMENTS

Figure 1A:
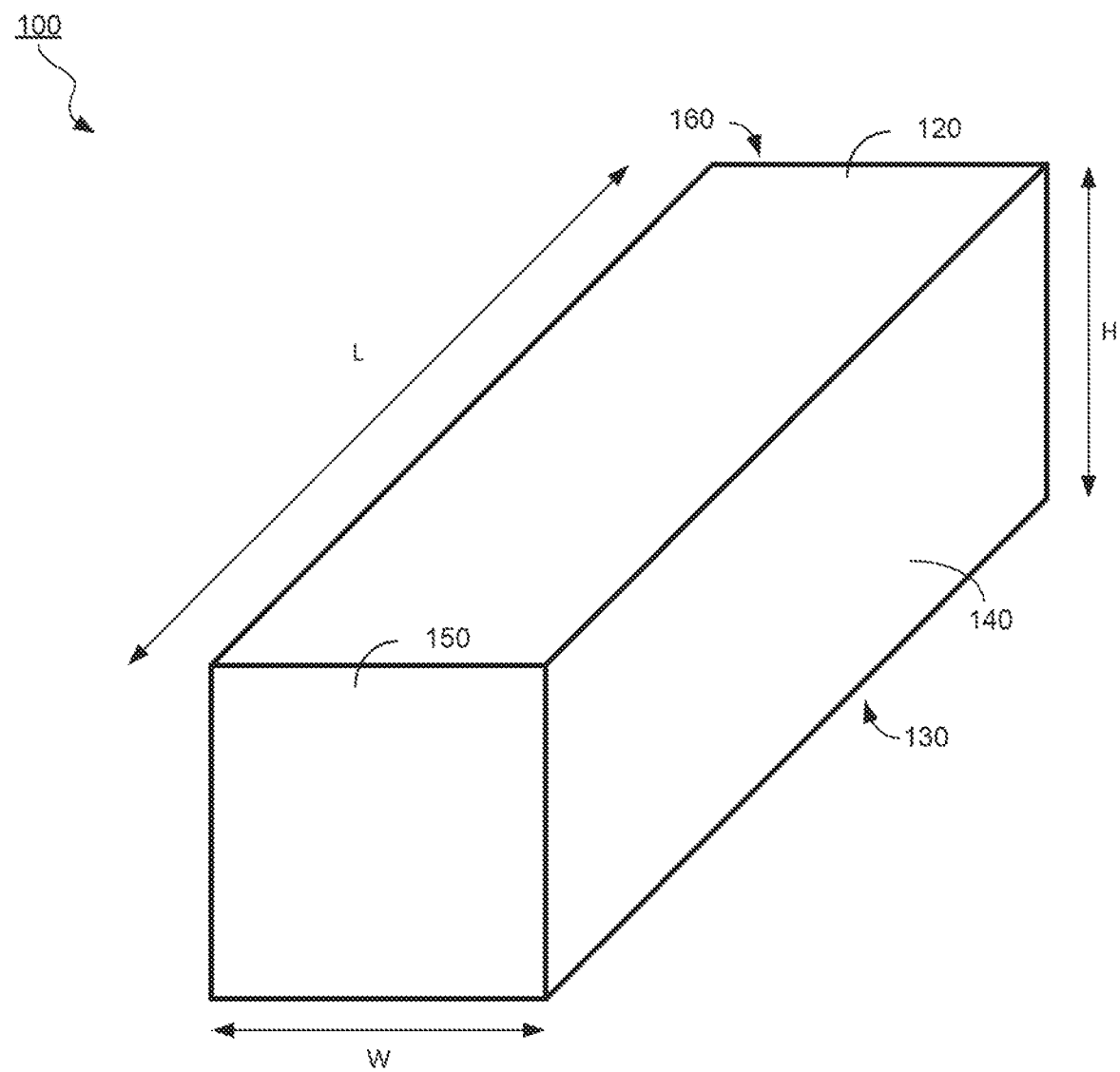
FIG. 1A illustrates a perspective view of a standard shipping container that can be used to provide an indoor farming container or module 100, in accordance with some embodiments of the invention.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

FIG. 1A illustrates a perspective view of a container or enclosure 100 that may be utilized to provide an indoor farming module 100, in accordance with some embodiments. In some embodiments, the container 100 is a standard shipping container used for shipping merchandise across oceans or seas, typically on cargo tankers, and thereafter loadable and shipped on land via "18-wheeler" trucks. Such standard shipping containers are ubiquitous today and used shipping container can be purchased at relatively inexpensive prices. Thus, "ready made" containers that are relatively inexpensive can be retrofitted into indoor farming modules 100, in accordance with various embodiments of the invention, as described in further detail below. The standard shipping containers 100 are typically constructed of steel and are fully enclosed. As shown in FIG. 1A, a typical shipping container 100 is in the form an elongated rectangular box having a roof 120, floor 130, two side walls 140, a front wall 150 and a rear wall 160. In some embodiments, double doors (not shown) are provided on the front wall 150 to allow access to crops or plants (hereinafter collectively referred to as "crops") within the container 100 (e.g., for loading, unloading, inspecting, treating, etc.). Various types of doors (e.g., single, double, garage-type door, rolling-type door, etc.) can be retrofitted onto the front wall 150 as desired, or the existing doors of the standard shipping container 150 can be used. Similarly, the rear wall 160 can be retrofitted with various types of doors to allow personnel to access environmental control systems and equipment located at the rear area of the container 100, as discussed in further detail below.

Standard shipping containers typically have a length (L) of 40 feet, a height (H) of 9 feet and 6 inches, and a width (W) of 8 feet. The inventors have discovered that the dimensions of standard shipping containers, especially when occupied to maximum capacity with crops and provided with environmental controls for year-round farming, provide a cost-effective approach to indoor farming. However, it is understood that in alternative embodiments, the invention is not limited to retrofitting standard shipping containers to provide indoor farming modules 100. Other types of enclosures, containers, or structures having similar or different dimensions, and made with the same or different materials, can be utilized based on the principles of the invention disclosed herein, in accordance with various alternative embodiments of the invention.

Figure 1B:
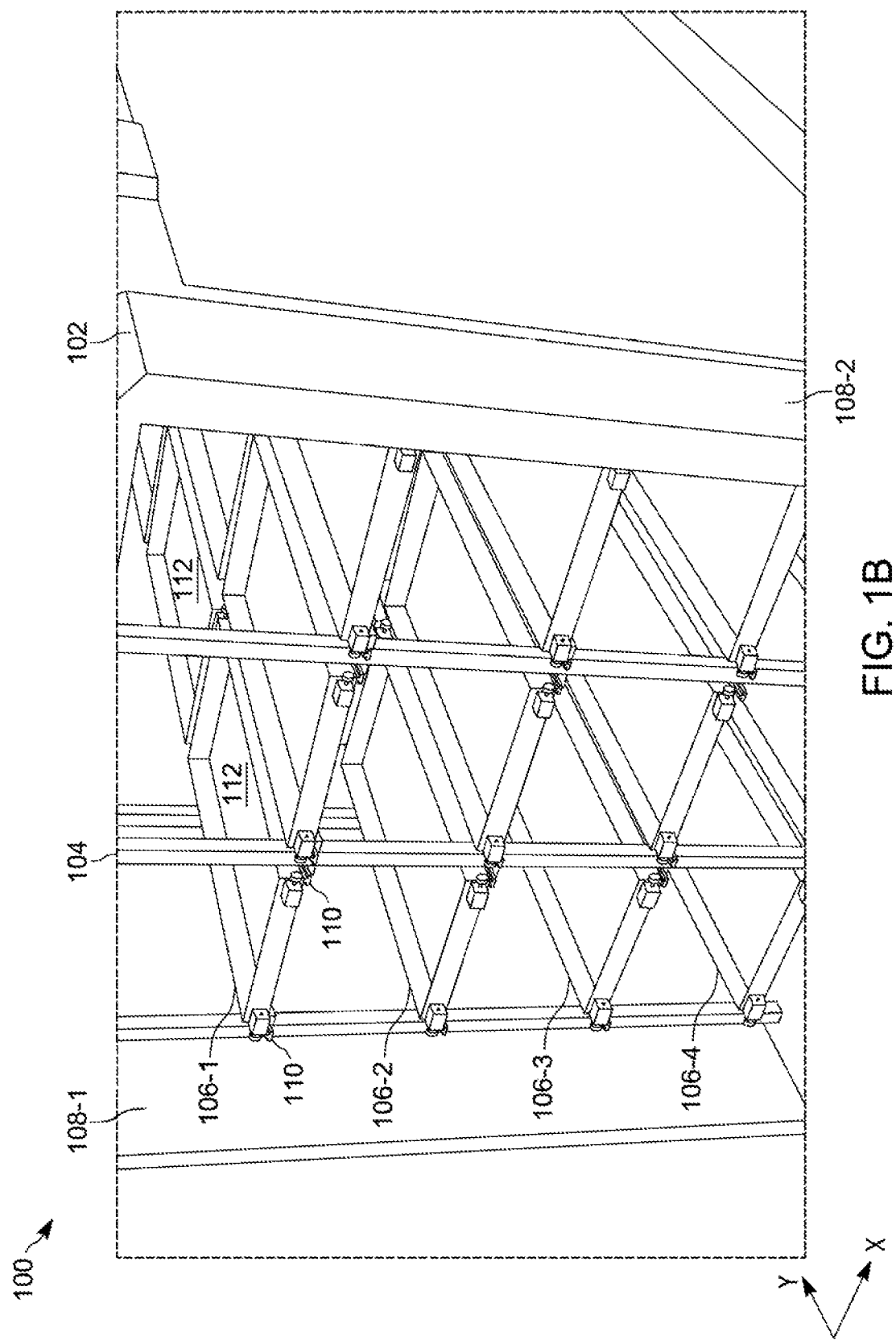
FIG. 1B illustrates an exemplary perspective view of an indoor farming module 100 open at one end to reveal a plurality of vertical layers of plant trays, each vertical layer having a plurality of rows of plant trays and extending across an entire interior width of the module 100, in accordance with some embodiments of the invention.

FIG. 1B illustrates an exemplary perspective view of an indoor farming module 100 with the front wall 150 opened or removed for purposes of showing an interior compartment 102 of the container 100, in accordance with some embodiments of the invention. In the illustrated embodiments, an air circulation system, a liquid circulation system, and a lighting system, which are discussed separately in detail below, are omitted in the indoor farming module 100 for clarity of illustration purposes. As shown in FIG. 1B, the indoor farming module 100 comprises an interior compartment 102. In some embodiments, the module 100 is a standard refrigerated shipping container that is retrofitted for indoor farming, as described in further detail below. In the illustrated embodiment, the indoor farming module 100 comprises a chassis 104. In some embodiments, the chassis 104 comprises a plurality of vertical frame members and a plurality of horizontal frame members. In the illustrated embodiments, the chassis 104 comprises 4 tiers, i.e., a first tier 106-1, a second tier 106-2, a third tier 106-3 and a fourth tier 106-4. Each of the 4 tiers 106 of the chassis 104 extends from a first wall 108-1 to a second wall 108-2 of the container compartment 102 in a first direction (i.e., x direction). In some embodiments, the first wall 108-1 and the second wall 108-2 are sidewalls along the long side of the container compartment 102.

Each of the 4 tiers 106 of the chassis 104 comprises three pairs of guide rails 110 extending along a second direction (i.e., y direction) perpendicular to the first direction. In some embodiments, the three pairs of guide rails 110 are parallel and configured side-by-side to one another so that the three pairs of guide rails in a tier 106 occupy the entire width of the container compartment 102 (i.e., space between the first wall 108-1 and the second wall 108-2).

In the illustrated embodiments, a plurality of carts 112 with wheels sized and spaced to roll on the pair of guide rails 110 are moveably positioned within the chassis 104. Each of the plurality of carts 112 is detachably linked to an adjacent cart 112 on the same pair of guide rails 110 through a cart coupler (not shown), as discussed in further detail below. In some embodiments, the cart coupler is also configured to be coupled and secured to an articulated robot when being transferred, as described in further detail below. Each of the plurality of carts 112 in the indoor farming module 100 is configured to carry a tray, which contains a seed pod (not shown) in which a plurality of plants are planted. In some embodiments, the seed pod comprises a plurality of holes and an arrangement of holes is determined according to a growth condition of the plurality of plants. In some embodiments, each of the three pairs of guide rails can carry 8 carts and the indoor farming module 100 can carry a maximum number of 96 carts.

A lighting assembly and a water circulation assembly are mounted on the plurality of horizontal frame members of the chassis 104 so as to provide light illumination and liquid supply to each of the trays in the corresponding cart, in accordance with some embodiments, and as discussed in further detail below. In some embodiments, the container compartment 102 is fully closed using a roll-up door (not shown) on a first end so as to maintain the growth condition (e.g., humidity, temperature, CO2 level, etc.) within a fully enclosed environment. The roll-up door is opened when a cart is being transferred in or out of the compartment 102, for example. It is noted that the indoor farming module 100 illustrated in FIGS. 1A and 1B, is merely an example, and is not intended to limit the invention. Accordingly, it is understood that a chassis in the indoor farming module 100 of FIG. 1 can be configured with any numbers of tiers 106, any numbers of guide rails 110, and can carry any numbers of carts 112, in accordance with various embodiments of the invention.

Figure 2:
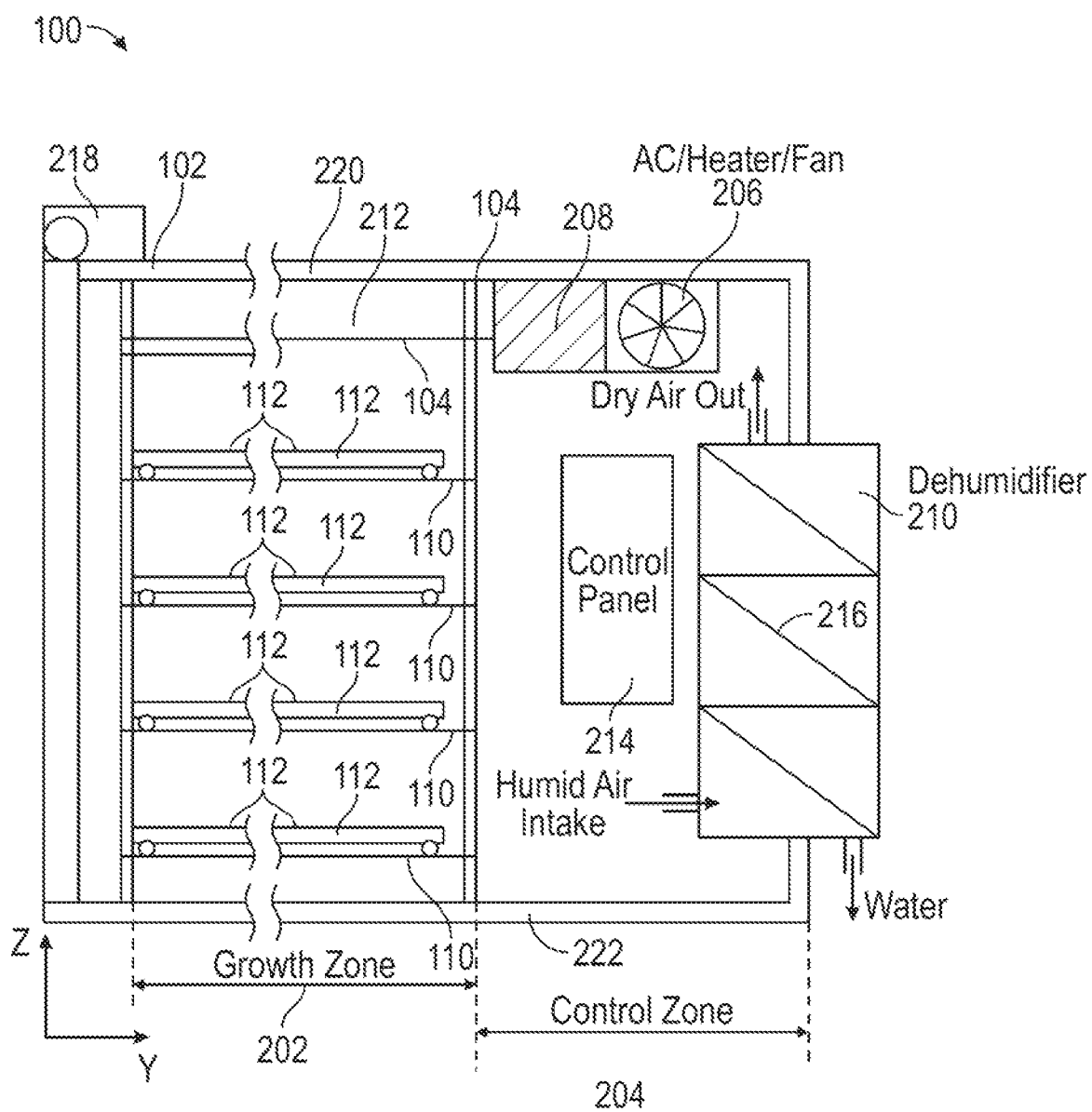
FIG. 2 illustrates an exemplary side view of an indoor farming module 100 with an air circulation system, in accordance with some embodiments of the invention.

FIG. 2 illustrates an exemplary side view of indoor farming module 100 with an air circulation system, in accordance with some embodiments of the invention. In the illustrated embodiments, a liquid circulation system, and a lighting system, which are discussed in detail below, are omitted for clarity of illustration purposes. In the illustrated embodiments, the indoor farming module 100 comprises a container compartment 102, wherein the container compartment 102 is divided into two zones along the Y direction, i.e., a first zone 202 and a second zone 204. In some embodiments, the first zone 202 is a grow zone and the second zone 204 is a control zone. In some embodiments, the first zone 202 comprises a chassis 104 with a plurality of horizontal and vertical frame members to support a plurality of carts 112, wherein the plurality of carts 112 each carries a tray with a plurality of plants (not shown), as described above. In some embodiments, the container compartment 102 is configured with a roll-up door 218 on a first end of the container compartment 102. Furthermore, the container compartment 102 comprises a structural floor 222.

In some embodiments, the second zone 204 comprises an air blowing unit 206, an air conditioning unit 208, and at least one dehumidifier 210. In the illustrated embodiment, the first zone 202 further comprises a drop ceiling 212, which is coupled to the air blowing unit 206. In some embodiments, the air blowing unit 206, the air conditioning unit 208, the at least one dehumidifier 210, and the drop ceiling 212 are configured to provide an effective air circulation system at controlled temperatures for the plurality of plants on each of the plurality of carts 112 at different tiers 106 of the chassis 104 in the first zone 202 of the container compartment 102. The air flow pattern which is created by these components of the air circulation system are discussed in detail below. In some embodiments, the control zone 204 further comprises a control panel 214, which is configured to monitor, maintain, and control environmental parameters in the indoor farming module 100, which is discussed in detail below. In some embodiments, the at least one dehumidifier 210 in the control zone 204 is mounted through the rear wall 160 of the indoor farming module 100 at a second end and supported by a rack 216.

Figure 3A:
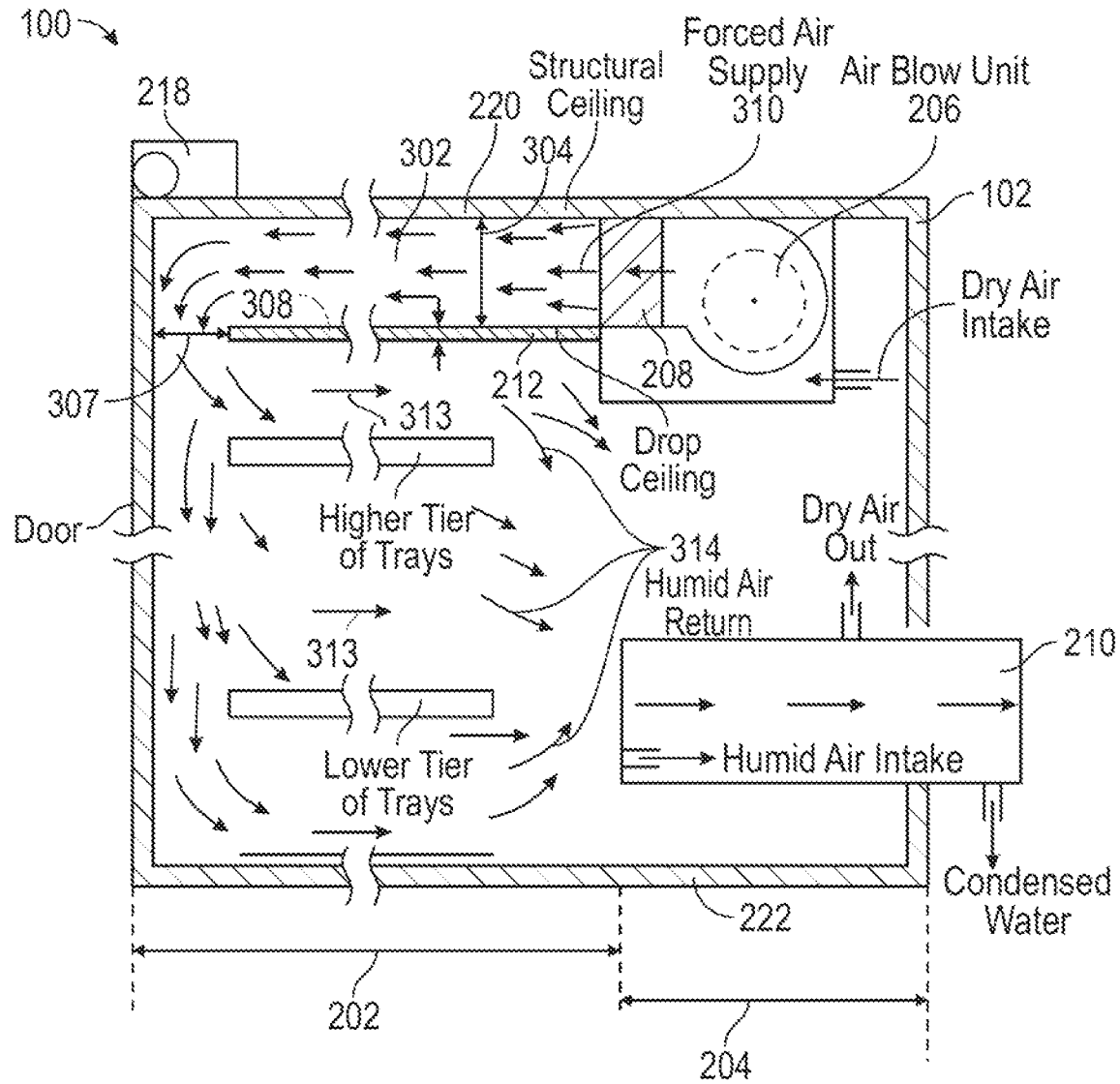
FIGS. 3A-3C illustrate patterns of air circulation provided by an air circulation system in an indoor farming module 100, in accordance with some embodiments of the invention.
Figure 3B:
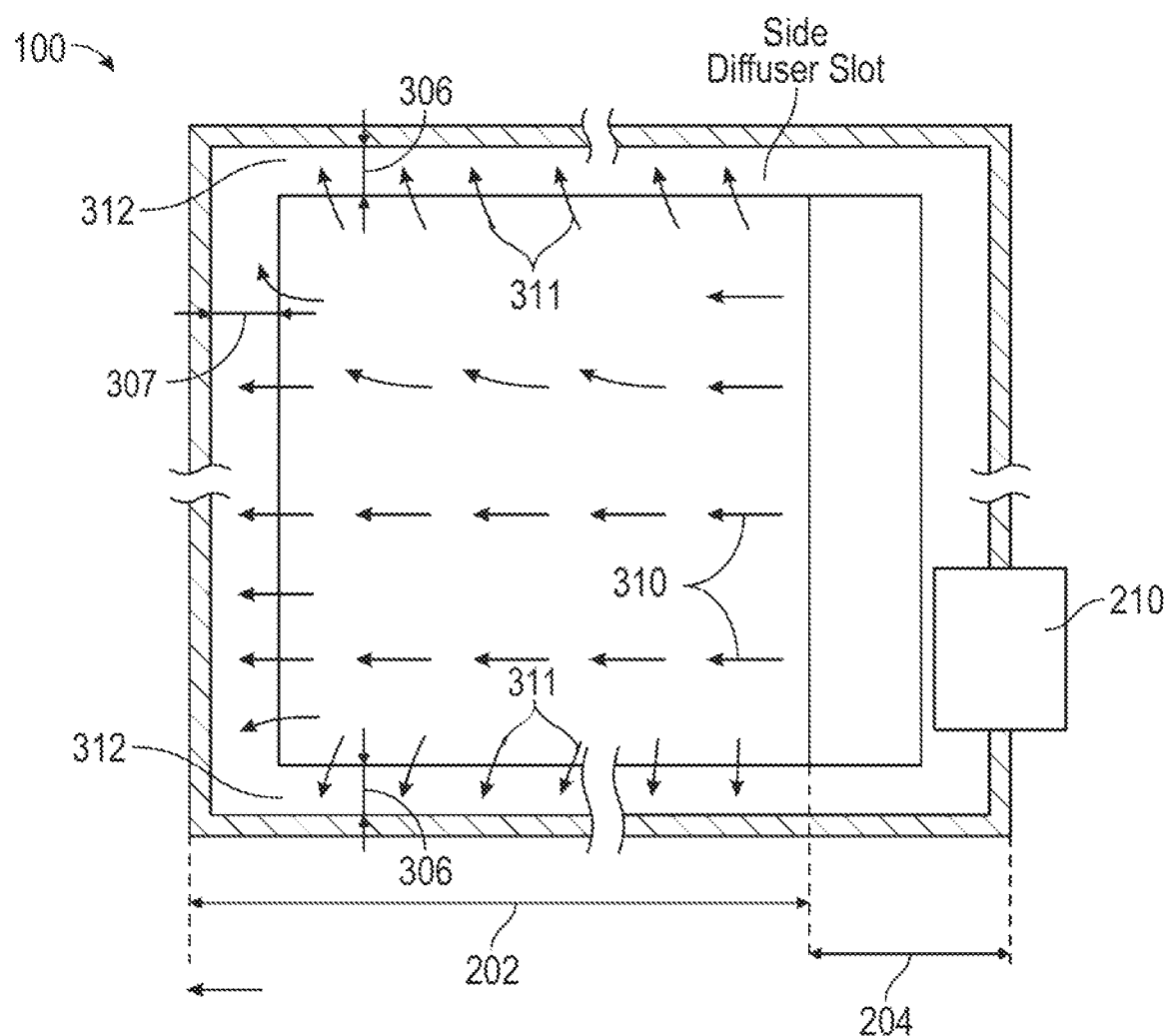
Figure 3C:
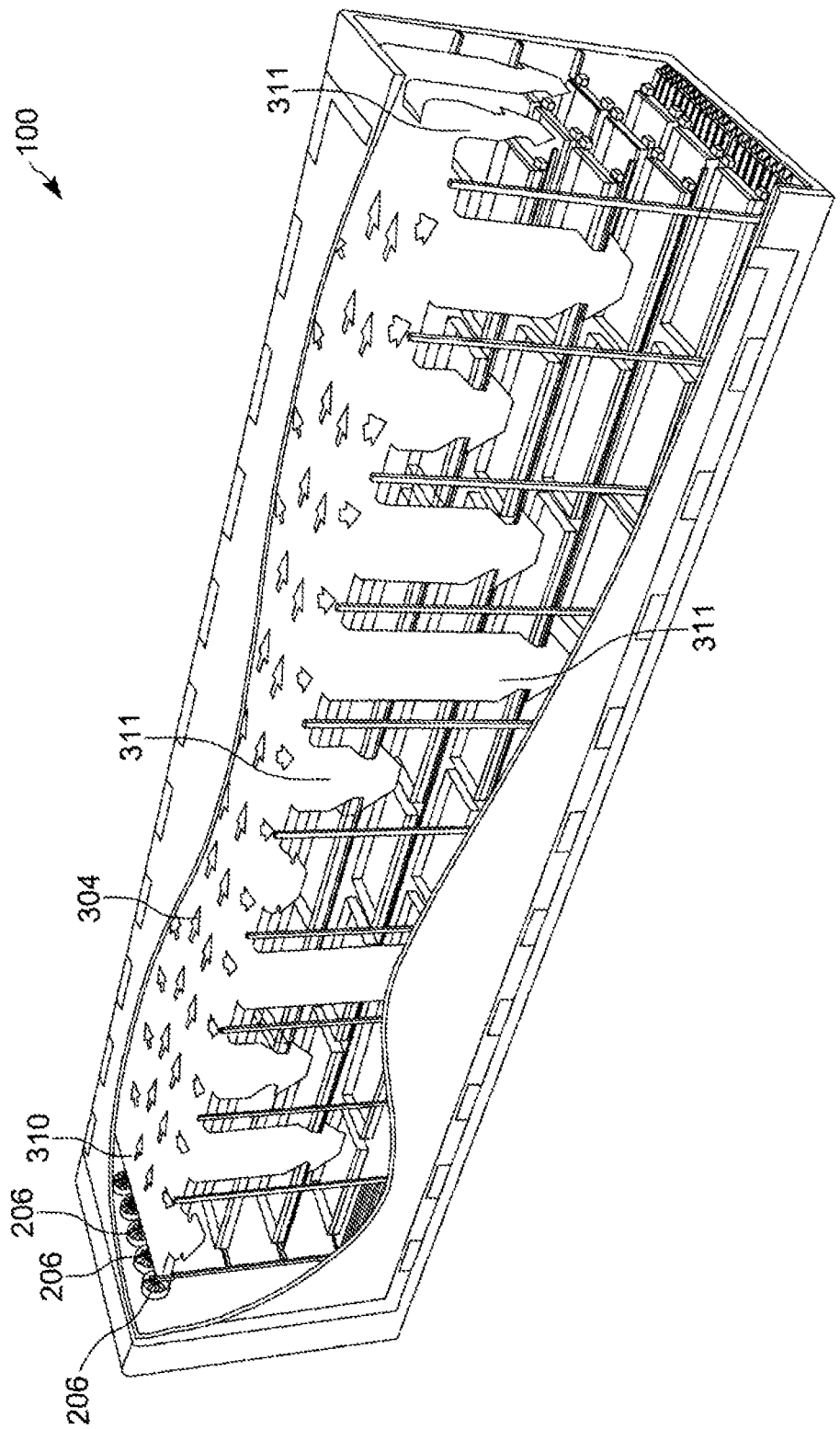

FIGS. 3A-3B illustrate patterns of air circulation provided by an air circulation system in an indoor farming module 100, in accordance with some embodiments of the invention. FIG. 3A is a cross-sectional side view, FIG. 3B is a cross-sectional top view of the indoor farming module 100, and FIG. 3C is a 3 dimensional (3D) view of the indoor farming module 100. In the illustrated embodiments, the air circulation system comprises an air blowing unit 206, an air conditioning unit 208, a drop ceiling 212, and a de-humidifying unit 210. In some embodiments, the air blowing unit 206 is sized based on plant mass and container volume. In some embodiments, the air conditioning unit 208 is used to condition the atmosphere in grow zones in the indoor farming module and is sized based on heat generated from a lightning assembly. It is generally desirable to create laminar flow of air in the vicinity of the plants within the grow zone 202.

In some embodiments, the air conditioning unit 208 produces cool dry air which is then pulled into the recirculation fans and is forced into the space above the drop ceiling 212 (i.e., a plenum space) located at the top of the grow zone 202. In some embodiments, the drop ceiling 212 has gaps along the left and right hand sides to facilitate air movement, as discussed in detail below. When the cool air enters the drop ceiling 212, it becomes pressurized, which causes a positive displacement. The displacement causes a portion of the air to be distributed down the sidewalls. In some embodiments, a motorized damper controls the volume of the remaining air exiting the plenum. In some embodiments, predetermined set points in the control program adjust airflow as plant mass increases during different stages of the growth cycle. In this design, the air circulation system works as a push pull air exchange that is picking up heat and humidity as it travels back to be reconditioned.

In the illustrated embodiments, the air blowing unit 206 and air conditioning unit 208 are integrated with a second end of the drop ceiling 212 so as to blow air into a plenum space 302 between the drop ceiling 212 and a structural ceiling 220 of the indoor farming module 100. In some embodiments, a height 304 of the plenum space is predetermined or fixed. For example, in one embodiment, the height 304 of plenum space 302 is 6 inches. In some embodiments, the height 304 of the plenum space 302, defined by the drop ceiling 212 and the structural ceiling 220, can be adjusted, tilted, and customized according to a requirement in growth condition in the indoor farming module 100. In some embodiments the height 304 of the plenum space 302 is in the range of 5 to 8 inches. It is noted that optimal airflow within the plenum space 302 can be achieved by modifying the size of the plenum space 302 and the output of the air blowing unit 206. In some embodiments, the airflow exits plenum space 302 at the front end near the front wall 150 at a rate between 1260 ft/min to 1400 ft/min. The speed of the airflow in the plenum space may be proportional to the size of the container or grow zone. In some embodiments, the air circulation system generates airflow at the exit of the plenum in a range of 0.581 to 0.651 ft/min per cubic foot of the grow zone volume.

In some embodiments, a thickness 308 of the drop ceiling 212 is approximately 1/8 inches. In some embodiments, the drop ceiling 212 comprises a plurality of panels, wherein each of the plurality of panels comprises fiberglass reinforced plastic (FRP) boards. In some embodiments, the FRP boards are installed at a width of 219.5 centimeters for a length of 1066.80 centimeters. In some embodiments, the air blowing unit 206 comprises at least a fan. In some embodiments, the air blowing unit can provide an air flow in a range of 8520 cubic centimeter per minute.

In the illustrated embodiment, forced air supply 310 enters the plenum space 302 from a second end after being produced by the air blowing unit 206 and conditioned by the air conditioning unit 208. The air blowing unit 206 has a capacity determined according to plant mass and a volume of the container 102. The forced air supply 310 creates a greater atmospheric pressure in the plenum space 302 resulting in an active circulation of air in the indoor farming module. In some embodiments, the forced air supply 310 from the air blowing unit 206 is cool and dry. In some embodiments, a portion of the forced air supply 310 is directed by the plenum space 302 and discharged horizontally through the plenum space 302 from the second end to a first end. In some embodiments, a motorized damper controls the volume of the portion of the forced air supply 310 existing the first end. The forced air supply 310 is then directed down through a front gap 307 between the drop ceiling 212 and front wall 150 (or roll-up door 218) of container 102. In some embodiments, front gap 307 measures between 12 to 17 inches. The forced air supply 310 also flows vertically downward 311 through side diffuser slots 312 between the drop ceiling 212 and the structural side walls 108-1 and 108-2 of the container compartment 102. In some embodiments, a width 306 of the diffuser slots 312 is approximately 1 and 10/16 inches (4.13 centimeters). In some embodiments, the width 306 of diffuser slot 312 can be varied from 1.5 to 4 inches. In some embodiments, the air circulation system maintains the speed of the vertical airflow 311 between 98 ft/min to 177.17 ft/min (0.5 m/sec to 0.9 m/sec). It should be understood that the speed of the vertical airflow 311 can be reduced below 98 ft/min, but it is preferred that the speed of the vertical airflow not exceed 295 ft/min (1.5 m/sec).

The downward vertical airflow 311 enters spaces between the plurality of tiers 106 so as to provide efficient air circulation to the plurality of plants in trays. The airflow continues horizontally 313 between the plurality of tiers 106 of chassis 104 in grow zone 202. The air circulation system of the indoor farming module 100 maintains substantially laminar flow of the horizontal airflow 313 between the plurality of tiers 106 adjacent the plants growing therein. In some embodiments, the air circulation system maintains the speed of the horizontal airflow 313 between 195 ft/min to 295 ft/min (1 m/sec to 1.5 m/sec). In other embodiments, the air circulation system maintains the speed of the horizontal airflow 313 between 19 ft/min to 60 ft/min (0.1 m/sec to 0.3 m/sec). It should be understood that the speed of the horizontal airflow 313 can be reduced to 10 ft/min (0.05 m/sec), but it is preferred that the speed of the horizontal airflow 313 not exceed 390 ft/min (2 m/sec). The speed of the horizontal airflow 313 may be controlled by varying any combination of the following variables: the volume of the grow zone, the output of the air blow unit 206, the size of plenum space 302, the gap 307, the size of the side diffuser slots 312, and the distance between tiers 106.

As the airflow moves past the plants, it is directed to the de-humidifying unit 210 located at the second end of the container compartment 102 under the air blowing unit 206. In some embodiments, adjacent tiers of trays and the drop ceiling are mounted and configured to aid in this desired directional flow of the air. In some embodiments, the air blowing unit 206 and the air de-humidifying unit 210 can be configured and controlled according humidity data collected by a plurality of humidity sensors distributed in the indoor farming module 100 to help determine the desired flow rate in the module so as to provide optimized growth conditions for the plant in the trays. In some embodiments, the airflow is directly measured by at least one anemometer sensor. Based on upper and lower airflow parameters programed in the control unit, the control unit uses the motorized damper to control the size of the opening.

In some embodiments, the air flow is controlled by the controller 214, which can dynamically adjust the air flow according to plant mass as it increases during different stages of a growth cycle. As the dry and cool air enters space between tiers, humidity and temperature of the air flow increase. In some embodiments, the air dehumidifying unit 210 receives humid air return 314 from the grow zone 202 and provides dry air to the air blowing unit 206. Water condensed from the dehumidifying process is drained to a collection reservoir (not shown) for filtering and recycling. Thus, the air control system described above, and illustrated in FIGS. 3A-3C, facilitates the control of environmental parameters such as temperature, humidity, air content, etc., to precisely control and maintain optimal or predefined growing conditions within the grow zone 202 depending on the types of crops being grown and the state of their growth cycle, in accordance with various embodiments of the invention.

Figure 4A:
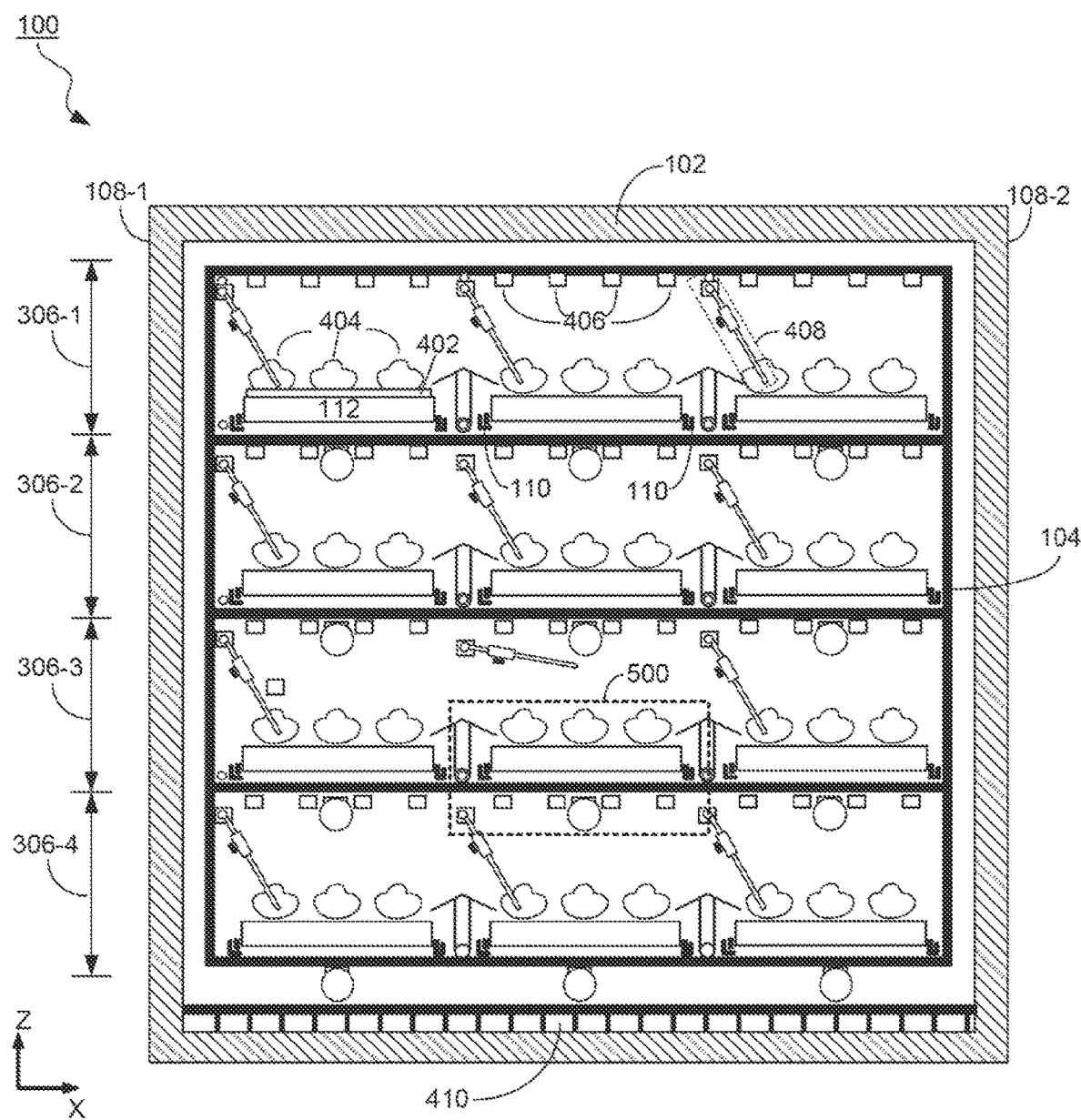
FIGS. 4A-4D illustrate exemplary side views and a top view of an indoor farming module 100 with a water circulation system and a lighting system, in accordance with some embodiments of invention.
Figure 4B:
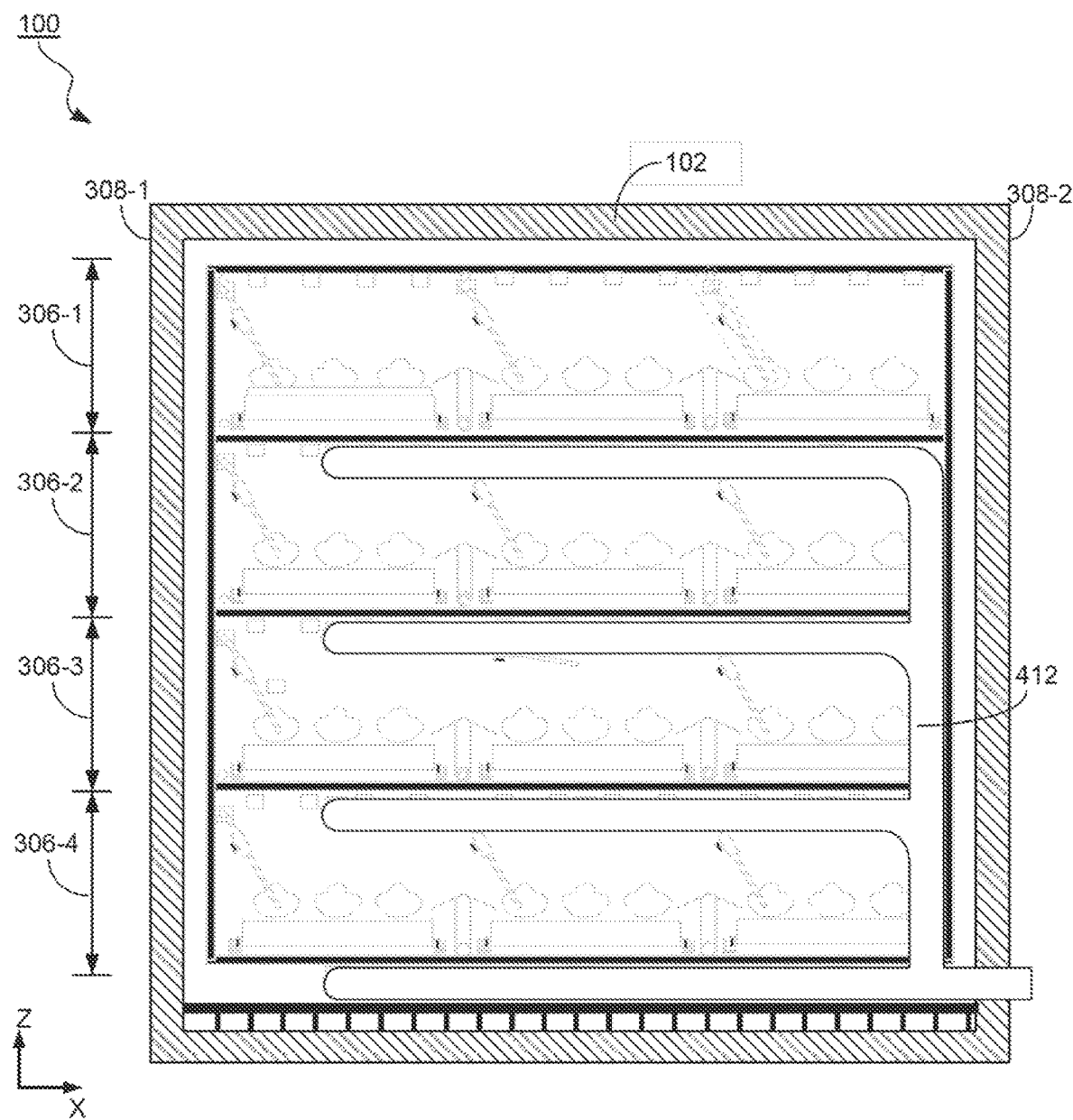
Figure 4C:
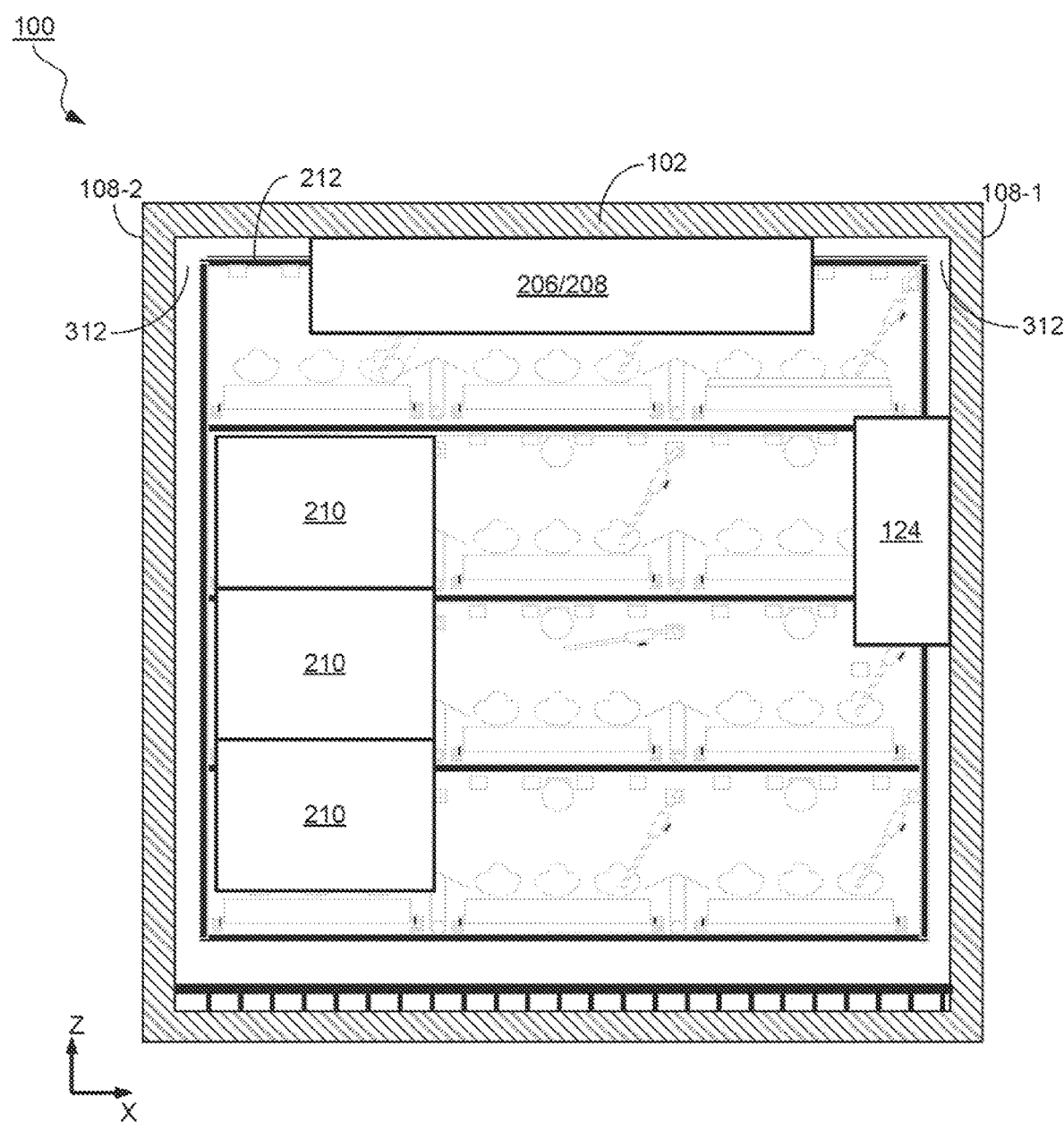
Figure 4D:
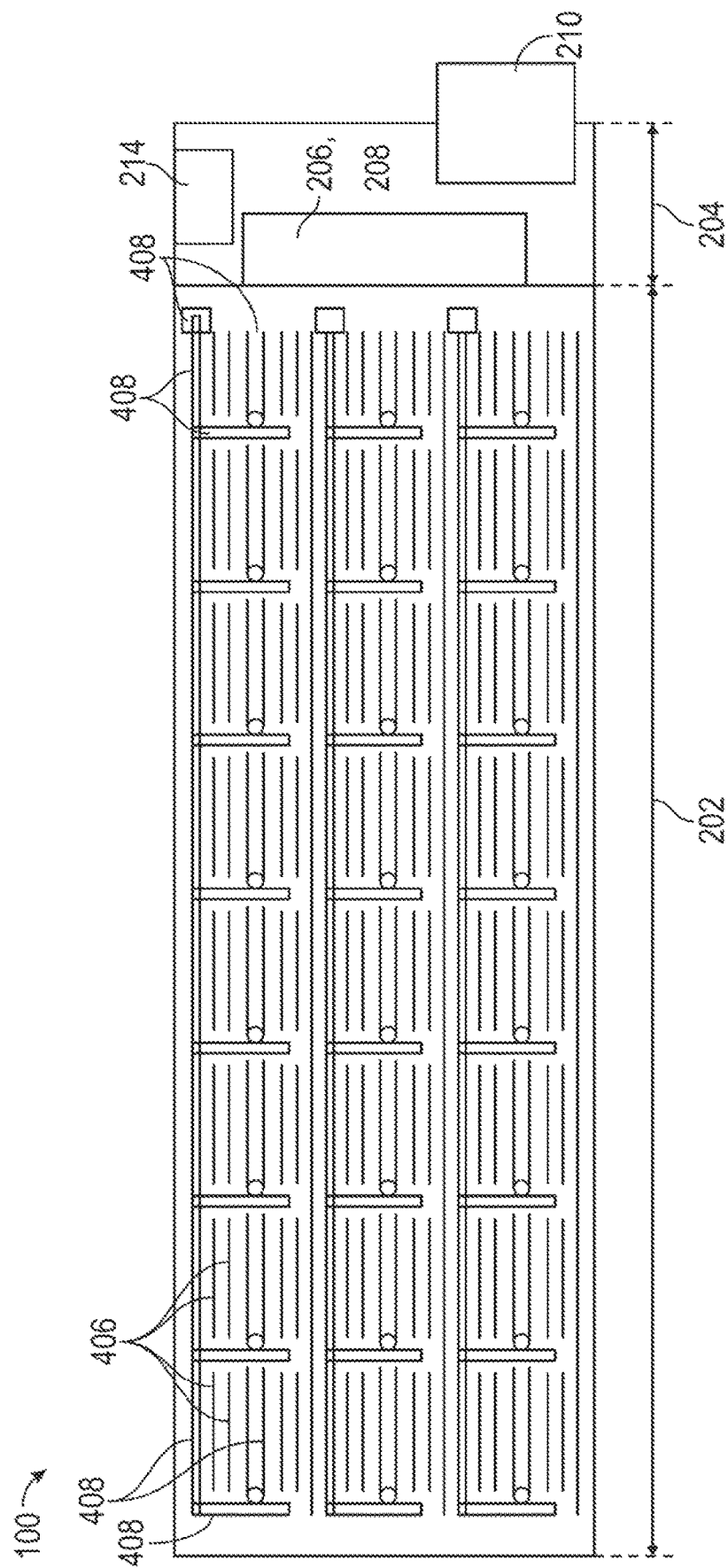

FIGS. 4A-4D illustrate a water circulation system and a lighting system of exemplary indoor farming module 100 with, in accordance with some embodiments of invention. It is noted that the indoor farming module 100 illustrated in FIGS. 4A and 4D, is merely an example, and is not intended to limit the invention. Accordingly, it is understood that additional structures and components may be provided in or coupled to the indoor farming module 100 of FIGS. 4A and 4D, and/or some other components may be omitted.

In the illustrated embodiment, each of the 4 tiers 106 of the chassis 104 extends from a first wall 108-1 to a second wall 108-2 of the indoor farming module 100 in a first direction (i.e., x direction). Each of the 4 tiers 106 comprises three pairs of guide rails 110. A plurality of carts 112 move along each pair of guide rails 110. Each cart 112 comprises a tray 402 in which a plurality of plants 404 are situated. Each of the carts 112 in the indoor farming module 100 is provided with a lighting assembly 406 above plants 404 and a liquid circulation assembly 408. In the illustrated embodiment, the lighting assembly 406 and the water circulation assembly 408 are structurally supported on the corresponding horizontal frame members over each of the plurality of carts 112. In the illustrated embodiments, the liquid circulation assembly 408 comprises a plurality of liquid supply conduits, a plurality of liquid return conduits, a plurality of liquid distribution tube assemblies, a plurality of drainage conduits, and a plurality of stepper motor assemblies, which are discussed in further detail below. In some embodiments, the lighting assembly 406 comprises at least one lighting module, which is discussed in further detail below. In some embodiments, the plurality of drainage conduits are coupled together to a drainage collection conduit 412 and further connected to external drainage container.

Figure 5A:
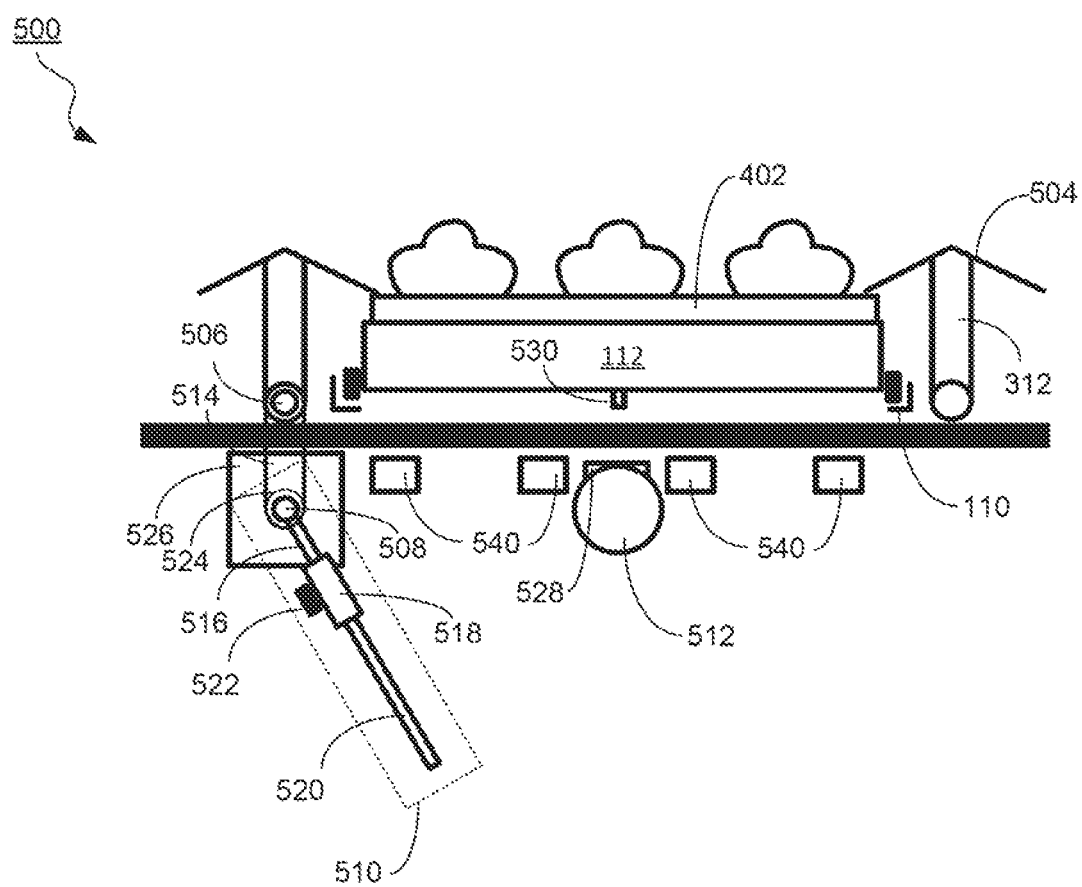
FIGS. 5A-5B illustrate zoomed-in front view and perspective view of an exemplary horizontal frame assembly 500 of the chassis 104 of an indoor farming module 100, in accordance with some embodiments of the invention. 100.
Figure 5B:
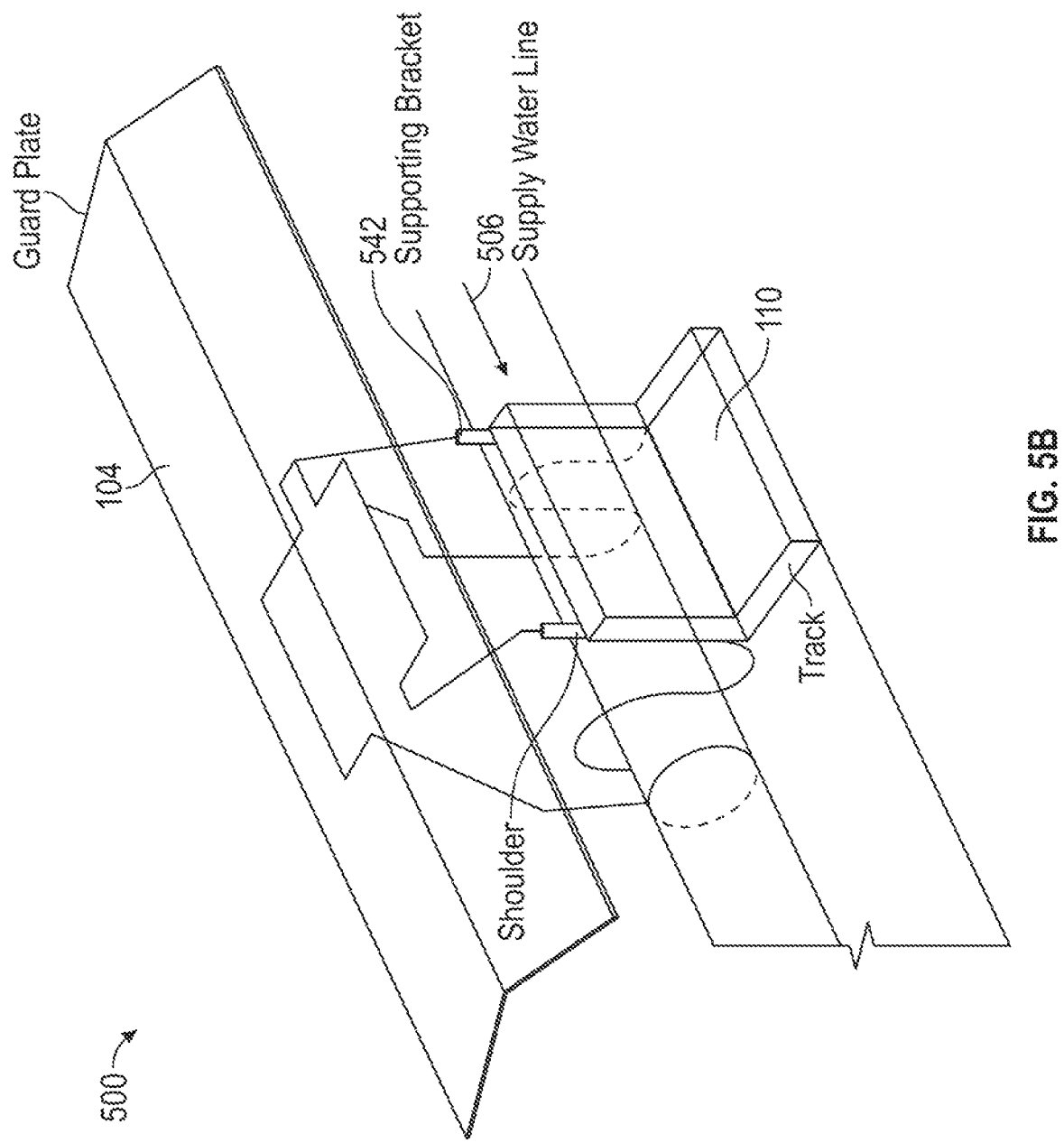

FIG. 5A-5B illustrate details of an exemplary horizontal frame assembly 500 of the chassis 104 of an indoor farming module 100, in accordance with some embodiments of the invention. The horizontal frame assembly 500 comprises a horizontal frame member 502, wherein the horizontal frame member 502 is configured to provide structural support to a liquid circulation assembly 408, a lighting assembly 406, a pair of guide tracks 110, and a leaf guard 504. In the illustrated embodiments, the liquid circulation assembly 408 comprises a liquid supply conduit 506, a liquid return conduit 508, a liquid distribution tube assembly 510, and a drainage conduit 512. In some embodiments, the liquid supply conduit 506, the liquid return conduit 508, and the drainage conduit 512 are shared by a plurality of trays 402 in a plurality of linked carts 112 located on a pair of guide rails 110. In some embodiments, the liquid supply conduit 506 and the liquid return conduit 508 are coupled to the horizontal frame member 502 through a water tube bracket 514. In some embodiments, the liquid supply conduit 506 comprises Schedule 80 PVC and the liquid return conduit 508 comprises stainless steel. In some embodiments, the liquid supply conduit 506 and the liquid return conduit 508 each has a diameter of 1.27 centimeters. In some embodiments, the leaf guard 504 is supported by a supporting bracket 542, wherein the supporting bracket 542 is further supported on the liquid supply conduit 506 and corresponding guide rails 110. In some embodiments, the leaf guard 504 is configured to guide leaves that drop from the plants to a tray or cart, which can be removed once the tray or cart is removed from the indoor farming module 100 so as to reduce contamination from rotted vegetation in the indoor farming module 100.

In some embodiments, the liquid distribution tube assembly 510 is configured to deliver irrigation liquid from the liquid return conduit 508 to each of the plurality of trays 402 to provide irrigation liquid containing water, nutrient and oxygen to support the growth of the plants in each of the plurality of trays 402. In some embodiments, the liquid distribution tube assembly 510 further comprises a liquid distribution tube 516, an aeration unit 518, and a liquid distribution nozzle 520. In some embodiments, the aeration unit 518 further increases the oxygen concentration in the irrigation liquid entering the tray 402. In some embodiments, a level of aeration can be individually tuned by a valve 522 on the aeration unit 518 according to the required growth conditions for the plants in the indoor farming module 100.

In some embodiments, a first end of the liquid return conduit 508 is also equipped with a swivel device 524 to facilitate a rotation motion of the liquid return conduit 508. In some embodiments, the liquid distribution tube assembly 510 can be rotated along the axis of the liquid return conduit 508 by a stepper motor assembly 526 located at a second end of the liquid return conduit 508, which is discussed in detail below.

In some embodiments, the stepper motor assembly 526 is coupled to the liquid return conduit 508 so as to provide a rotation motion to the liquid return conduit 508 in order to engage or disengage the plurality of liquid distribution tube assemblies 510 to or from corresponding trays 402. In some embodiments, the plurality of liquid distribution tube assemblies 510 are rotated away from the corresponding trays to allow carts 112 carrying the plurality of trays 402 to move along the pair of guide rails 110. This facilitates the movement of carts 112 into and out of container 102. In some embodiments, the stepper motor assembly 526 is coupled to a horizontal frame member 502 at the second end of the chassis 104 through a stepper motor bracket (not shown).

In the illustrated embodiments, the drainage conduit 512 comprises a plurality of drainage slots 528. In some embodiments, each of the plurality of drainage slots 528 is configured for receiving drainage liquid from the corresponding tray 402 located over the drainage conduit 512 through a tray drain insert (not shown). In some embodiments, the drainage conduit 512 is configured with a higher end and a lower end to aid the collection of the drainage liquid from the plurality of drainage slots 528. In some embodiments, the drainage conduit 512 comprises Schedule 80 PVC and has a diameter of 5.08 centimeters.

In the illustrated embodiment, the lighting assembly 406 supported by the horizontal frame member 502 comprises at least one lighting module 540. In some embodiments, each of the at least one lighting modules 540 comprises at least one of the following photon illumination sources: an incandescent light, a fluorescent light, a halogen light, a high pressure sodium light, a plasma light, and a light-emitting diode (LED) light, so as to provide photons for the photosynthetic reactions in plants 404 in the corresponding tray 402 within its illumination range. In some embodiments, the at least one lighting module 540 is further coupled to at least one power supply (not shown) to receive electric power. In some embodiments, the power supply for each of the at least one lighting module 540 can be monitored and controlled so as to manage the illumination intensity for the plants 404 in the corresponding tray 402.

Figure 6A:
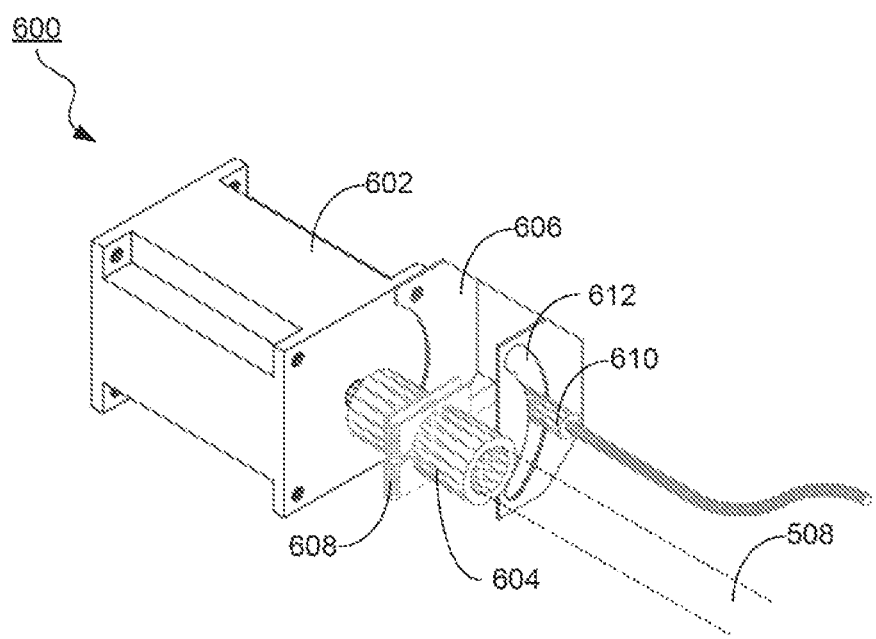
FIGS. 6A-6B illustrate a stepper motor assembly 600, in accordance with some embodiments of the invention.
Figure 6B:
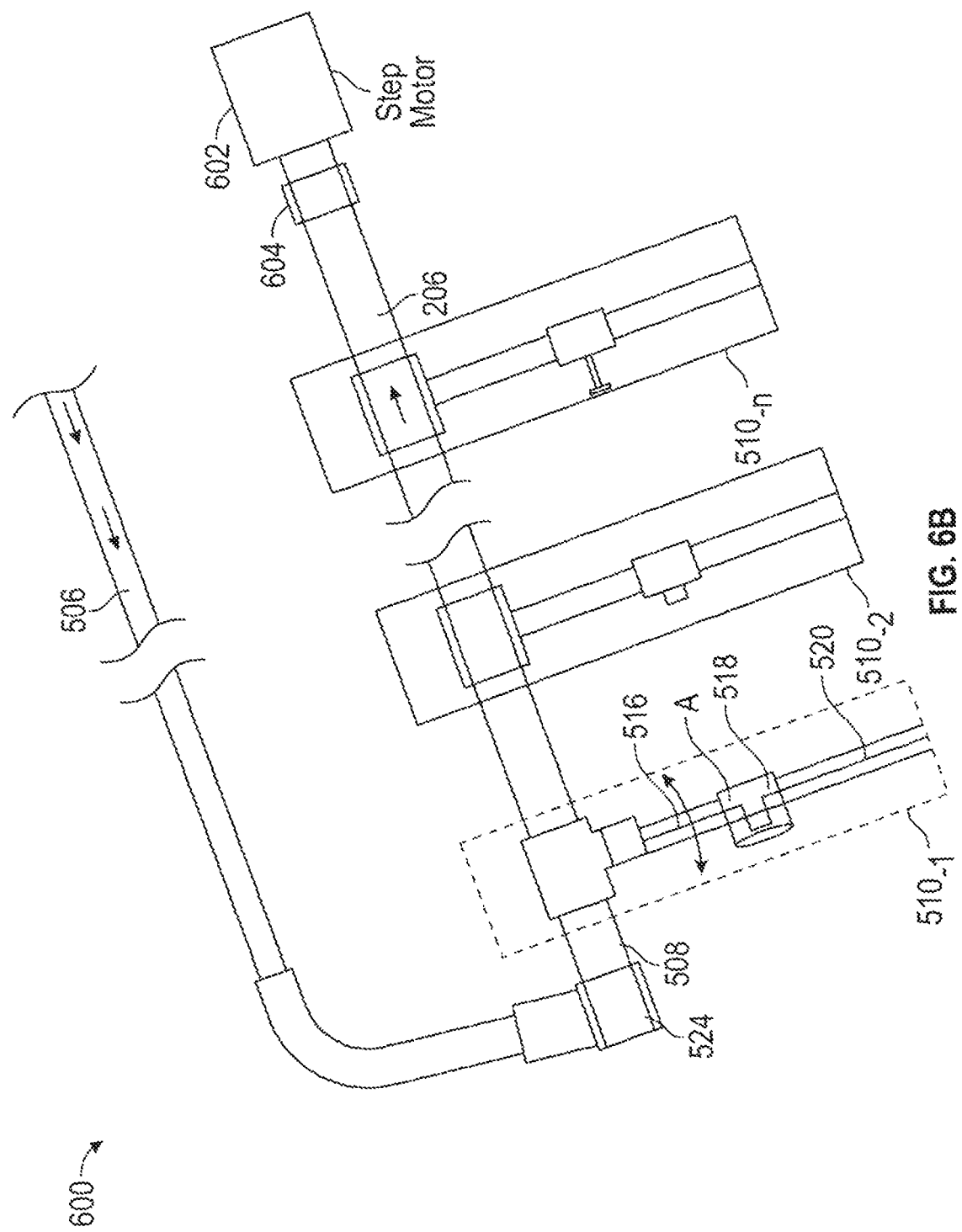

FIG. 6A illustrates a stepper motor assembly 600, in accordance with some embodiments of the invention. FIG. 6B illustrates the stepper motor assembly 600 coupled to the liquid return conduit 508, in accordance with some embodiments. In the illustrated embodiments, the stepper motor assembly 600 comprises a stepper motor 602, a coupler 604, a flag 606, a proximity sensor bracket 608, and a proximity sensor 610. In some embodiments, the stepper motor 602 is configured to provide rotational motion to the liquid return conduit 508, which in turn rotates corresponding ones of the plurality of liquid distribution tube assemblies 510. In some embodiments, the stepper motor 602 is coupled to the liquid return conduit 508 through the coupler 604. In some embodiments, the coupler 604 is also a cap configured to prevent irrigation liquid in the liquid return conduit 508 from leaking. In the illustrated embodiments, the flag 608 is attached to the coupler 604 and is configured to provide an indication of an angular position of the plurality of liquid distribution tube assemblies 510 attached to the liquid return conduit 508. In some embodiments, the proximity sensor 610 is supported on the proximity sensor bracket 606, which is coupled to the stepper motor 602.

In some embodiments, the proximity sensor 610 reads a position of the flag 608 so as to determine the angular position of the plurality of liquid distribution tube assemblies 510. In some embodiments, the proximity sensor bracket 606 comprises a curved slot 612, in which the proximity sensor 610 is positioned. The position of the proximity sensor 610 on the proximity sensor bracket 606 is determined according to a limit of the angular position of the liquid distribution tube assembly 510 that is limited by the curved slot 612. In some embodiments, the stepper motor 602 is controlled by an input from a Human-Machine Interface (HMI) touch screen.

Figure 7A:
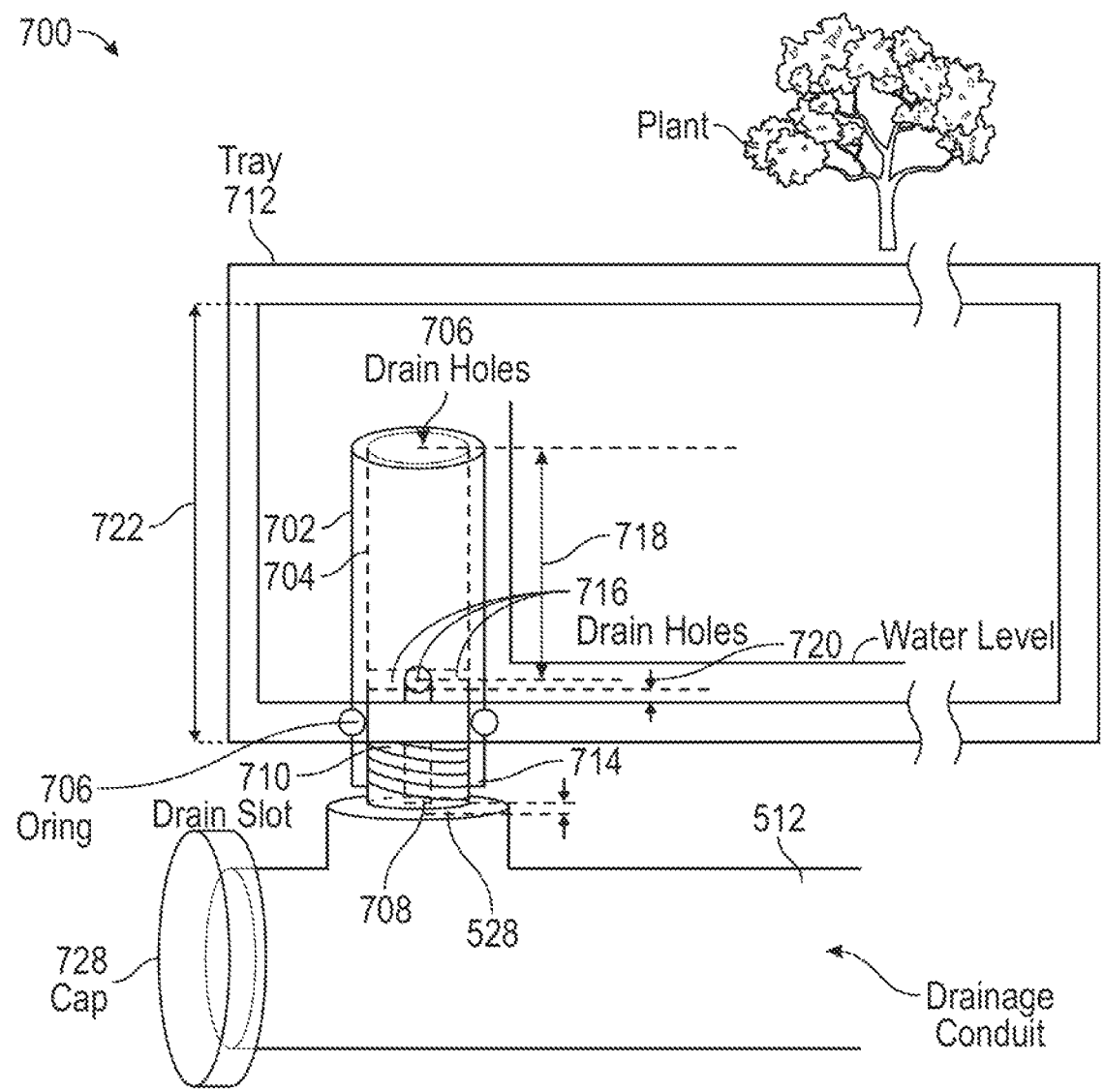
Figure 8A:
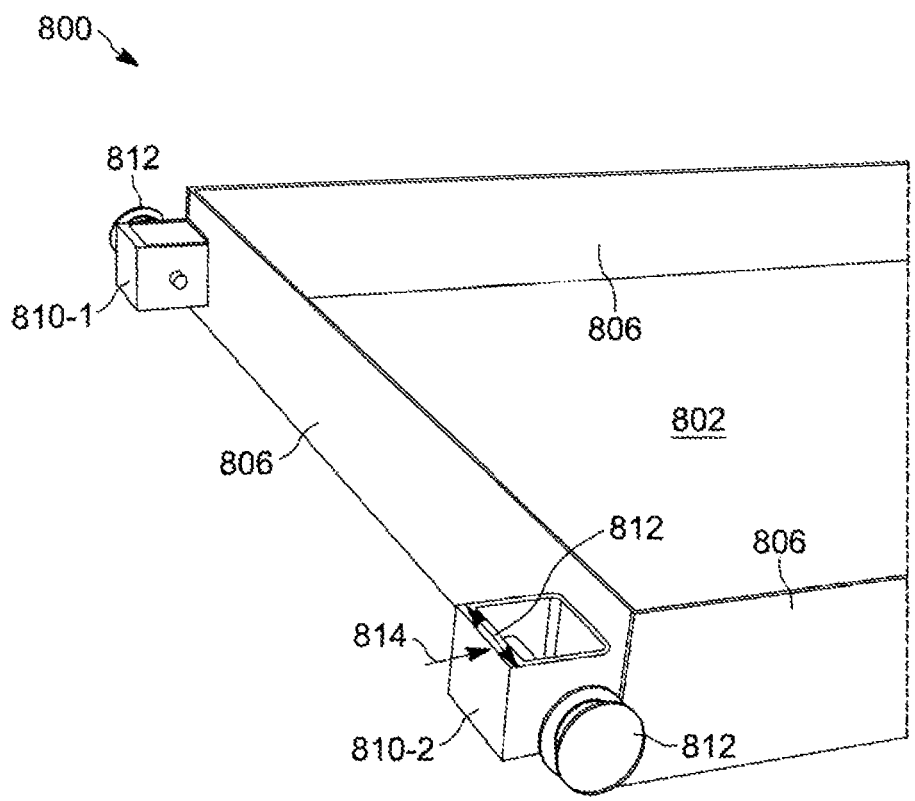
FIGS. 8A-8E illustrate an exemplary cart design in an indoor farming module 100, in accordance with some embodiments of the invention.
Figure 8B:
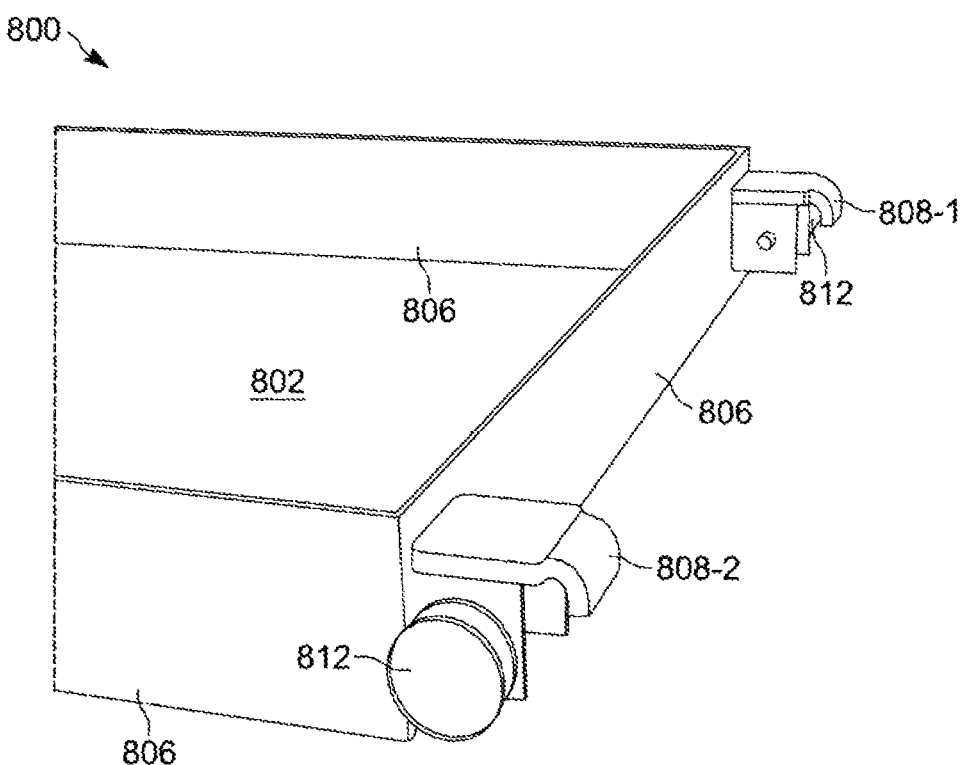
Figure 8C:
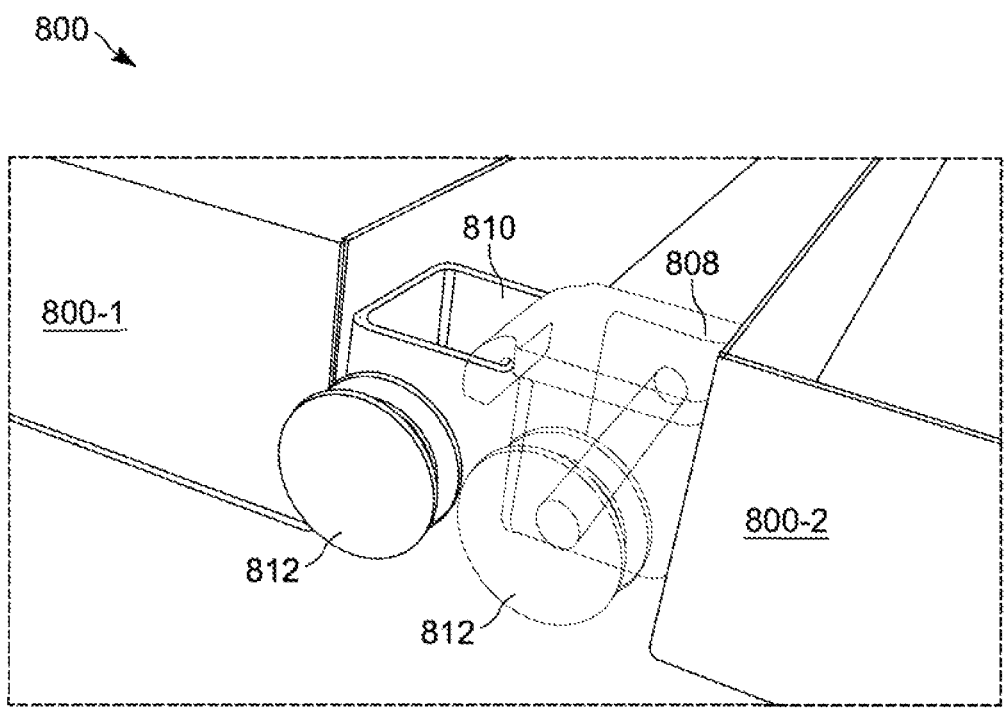
Figure 8D:
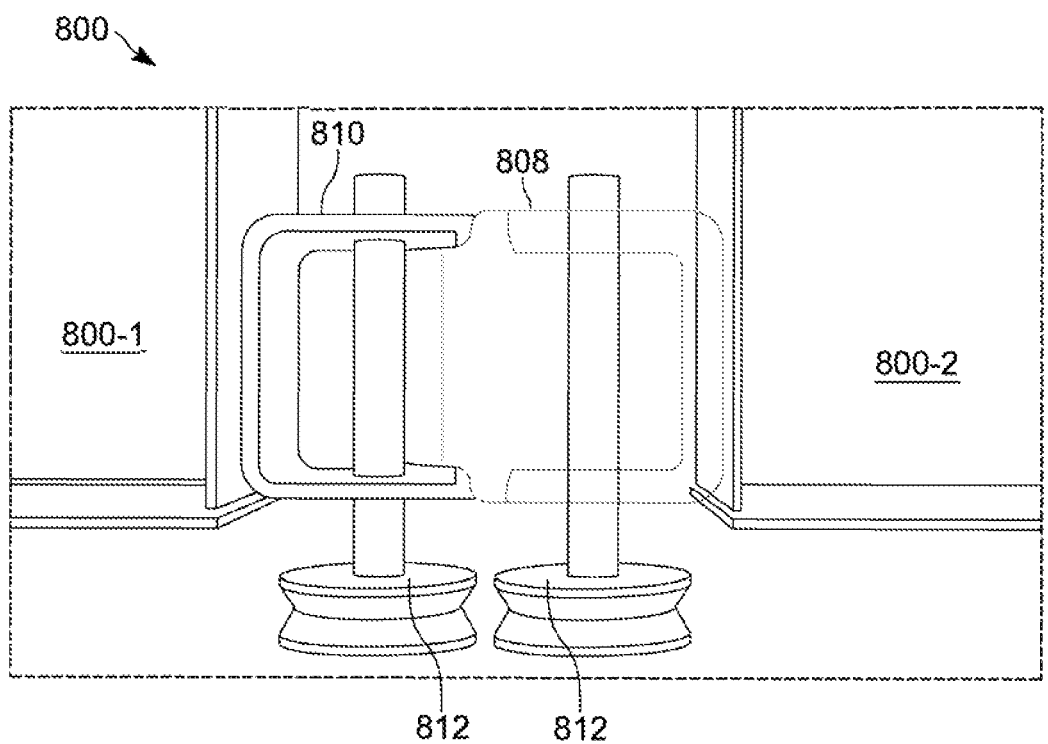
Figure 8E:
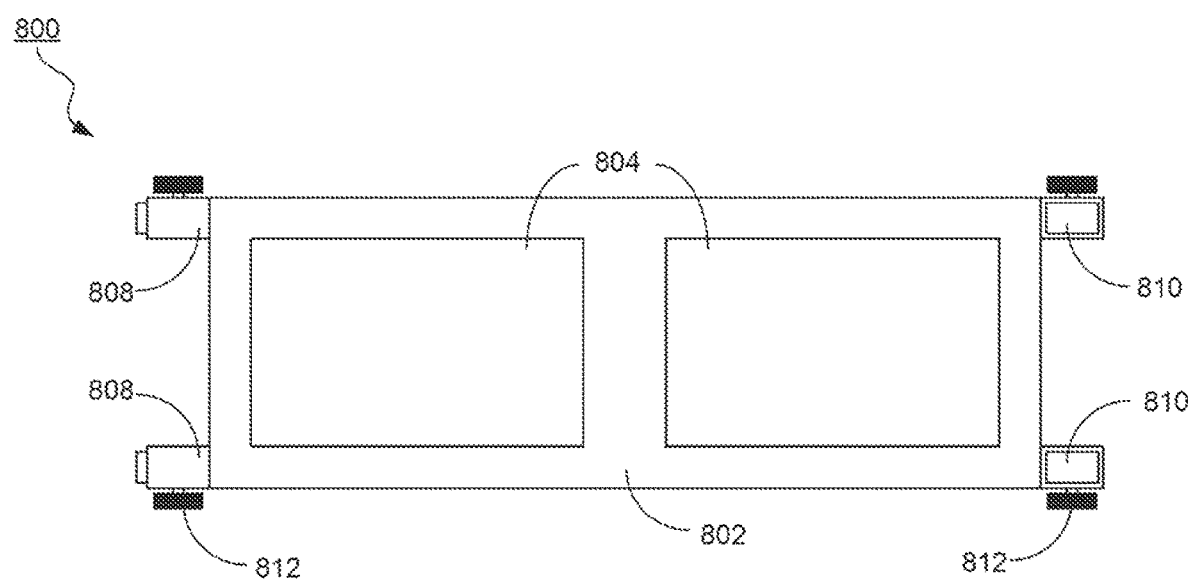

FIGS. 7A and 7B illustrate a cross-sectional side view and a top view, respectively, of a tray drain insert 700, in accordance with some embodiments of the invention. In the illustrated embodiment, the tray drain insert 700 comprises a tube with an outer surface 702 and an inner surface 704. The tray drain insert 700 has a first opening 706 at a first end and a second opening 708 at a second end. In some embodiments, the tray drain insert 700 is assembled through a hole 710 located at a bottom of a tray 712 using a nut 714. In some embodiments, the tray drain insert 700 further comprises at least one hole 716 extending from the outer surface 702 to the inner surface 704 and between the first and second ends. In some embodiments, a liquid level 720 at a steady state is determined according to the position of the at least one hole 716 relative to the bottom surface of the tray 712. In some embodiments, a distance between the first end of the tray drain insert 700 and the bottom surface of the tray 712 is equal to or smaller than a depth 722 of the tray 712. In some embodiments, the depth 722 is in a range of 11 centimeters.

In some embodiments, when the liquid level 710 increases in the tray 712 and rises above at least one hole 716, the irrigation liquid is drained through the at least one hole 716 to the second opening 708 on the second end of the tray drain insert 700 to a drainage conduit 512 through a drainage slot 528 located beneath the second opening 708. In some embodiments, when the at least one hole 716 is blocked and when the liquid level 720 increases further and rises above the first opening 706 of the tray drain insert 700, the irrigation liquid in the tray 712 can be also drained through the first opening 706 to the second opening 708 and further to the drainage hole 528 of the drainage conduit 512. As shown in FIG. 7A, the second opening 708 is located directly above the drainage hole 528, in accordance with some embodiments. In some embodiments, the tray 712 has a width 724 of 60.96 centimeters and a length 726 of 121.92 centimeters. In some embodiments, the drainage conduit 512 comprises a removable cap 728 on one end, which is configured to allow easy flushing of debris and waste out of drainage conduit 512.

FIGS. 8A-8E illustrate exemplary perspective views of a cart 800 in an indoor farming module 100, in accordance with some embodiments of the invention. In the illustrated embodiment, the cart 800 is configured to hold and transport a tray 402 along a pair of guide rails 110 on a chassis 104 in the indoor farming module 100. In some embodiments, the cart 800 has a generally horizontal and rectangular base plate 802. In some embodiments, the base plate 802 comprises a base frame with openings 804 shown in FIG. 8E. The base plate 802 is further configured with two pairs of side edges 806 that face opposite to each other and extend perpendicularly to the base plate 802. It is understand that other shapes for base are possible and are within the scope of this invention. In the illustrated embodiments, the base of the cart 802 has a length of 120.5 centimeters and a height of the side edges of 5 centimeters. In some embodiments, the cart 800 comprises stainless steel to meet a requirement in humidity and water resistance in the indoor farming module 100.

In the illustrated embodiments, the cart 800 further comprises a plurality of cart couplers. In some embodiments, the plurality of cart couplers comprises at least two hooks 808-1 and 808-2 coupled to a first end of the cart 800 and at least two staples 810-1 and 810-2 coupled to a second end of the cart 800. The cart coupler (i.e., a hook 808 and a corresponding staple 810) allows an easy engagement of two adjacent carts 800 on a common pair of rails/tracks 110. In some embodiments, when the two adjacent carts 800 are coupled by the cart coupler 808/810, the two carts 800 can be moved together along the pair of guide rails 110. In some embodiments, when a first cart 800-1 is lifted upwardly from the guide rails 110, as described in further detail below, the at least two hooks 808 of the first cart are decoupled from the at least two staples 810 of the adjacent second cart 800-2, allowing the first cart 800-1 to be separated from the adjacent cart 800-2 and removed from the indoor farming module 100. In the illustrated embodiment, four wheels 812 are mounted to the side edges of the cart 800 by attachment devices, such as welds or a carriage bolt, washer and nut (not shown). In the illustrated embodiments, the cart couplers 808/810 are welded at the lower ends of the side edges and a wheel 812 and corresponding axle is coupled to each cart coupler 808 and 810 using known techniques, as shown in FIGS. 8A-8E.

Figure 9A:
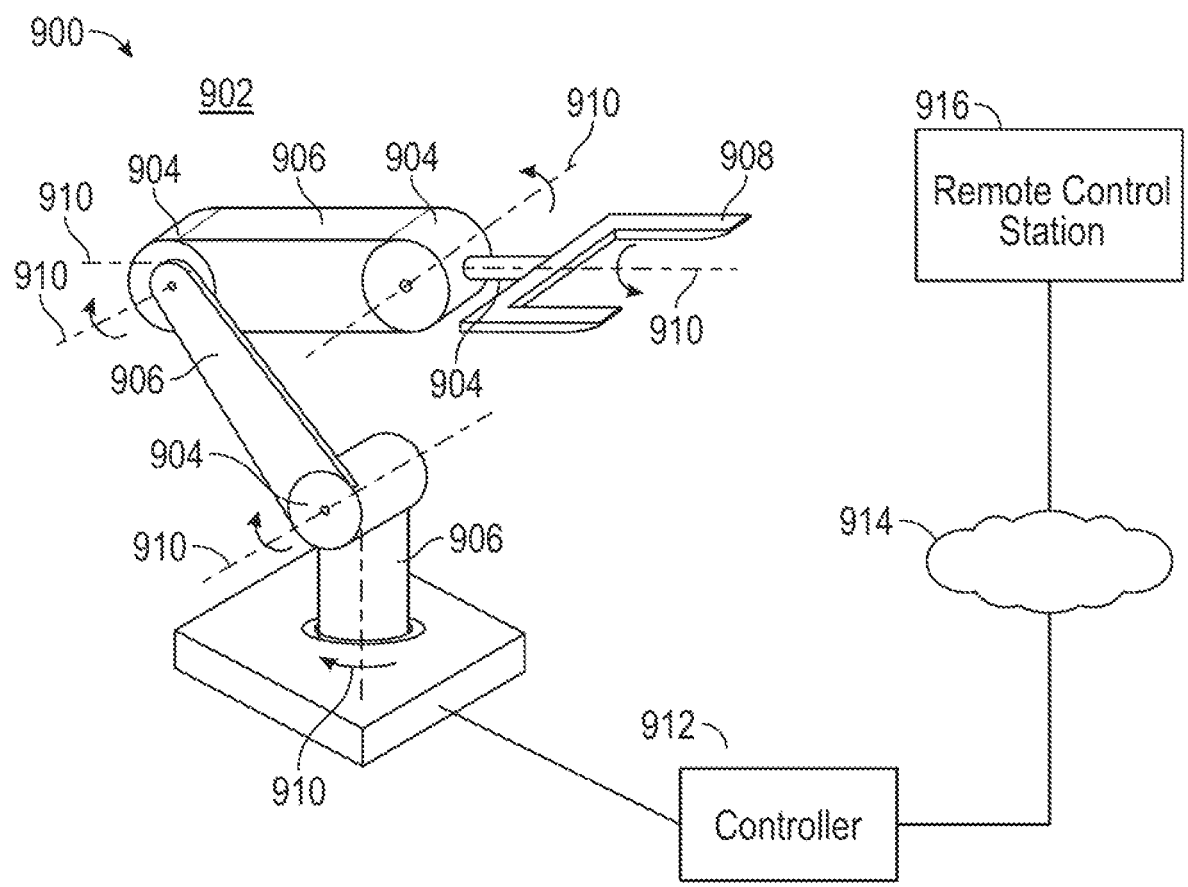
FIG. 9A illustrates an exemplary diagram of a tray-handling system 900 for an indoor farming module 100, in accordance with some embodiments of the invention.

FIG. 9A illustrates an exemplary diagram of a tray-handling system 900 for an indoor farming module 100, in accordance with some embodiments of the invention. In the illustrated embodiments, the tray-handling system 900 is designed for automatically loading and unloading carts 112 through a first end of the indoor farming module 100. In the illustrated embodiment, the tray-handling system 900 comprises an articulated robot 902, and a robot controller 912. In some embodiments, the tray-handling system 900 is configured to transfer a predetermined cart from the chassis 104 in the indoor farming module 100 to a predetermined position (e.g., a storage rack 906). In some embodiments, the tray-handling system 900 is configured to transfer a predetermined cart from the storage rack (not shown) to the chassis 104 of the indoor farming module 100.

In some embodiments, the articulated robot 902 is configured outside of the indoor farming module 100. In some embodiments, the articulated robot 902 comprises a plurality of joints 904 for controlling a plurality of arm segments 906 coupled to corresponding joints 904. In some embodiments, each of the plurality of joints 904 is coupled to an electric motor (not shown) for providing rotational motion to each of the plurality of joints 904. In some embodiments, the articulated robot 902 has a plurality of axes 910 allowing the articulated robot 902 to access and accurately load and unload carts 112 in the indoor farming module 100. In some embodiments, the articulated robot 902 comprises a fork-type attachment 908 to detachably couple a cart 112 during the transfer, which is discussed in further detail below. In the illustrated embodiment, the articulated robot 902 comprises three arm segments 906 and 6 axes of rotation 910.

In some embodiments, the robot controller 912 is configured to manage and operate the tray-handling system 900 according to a predetermined rule or a prescheduled task. In some embodiments, the pre-determined rule or the pre-scheduled task is determined according to the growth condition and growth stage of the plants in the tray on the cart 112. In some embodiments, a second robot (not shown) can be configured adjacent to the articulated robot 902 or the storage rack (not shown) to move the tray out of the cart 112 so that the plants in the tray can be harvested and the cart can be reused. In some embodiments, the robot controller 912 comprises a motion-planning unit, which is used to determine trajectories of the robot so as to move the predetermined tray to a predetermined location and register any changes in positions of other trays in the transferring process of the predetermined tray. In some embodiments, the robot controller 912 is coupled to a cloud computer 914, which further receives instructions from a controller 214 in the indoor farming module 100 and/or a remote control station 916. For example, when a cart 112 is determined to be unloaded from the indoor farming module 100, the controller 214 of the indoor farming module 100 pauses the irrigation schedule, rotates a plurality of liquid distribution tube assemblies 510, and opens a roll-up door 218, before the articulated robot 902 can be initiated.

Figure 9B:
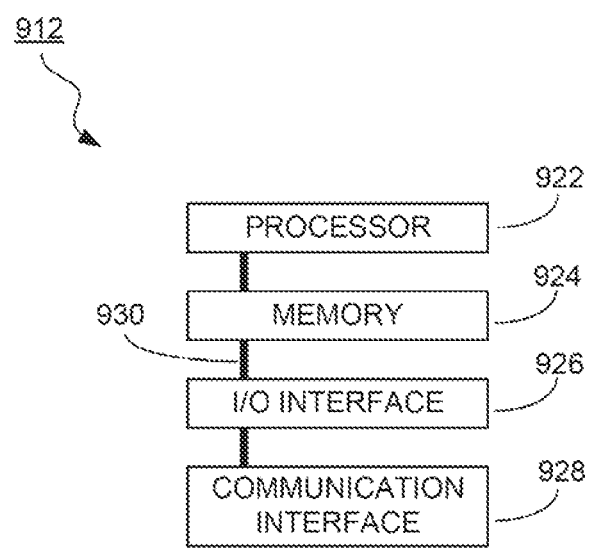
FIG. 9B illustrates an exemplary block diagram of a controller for an indoor faming module, in accordance with some embodiments of the invention.
Figure 10A:
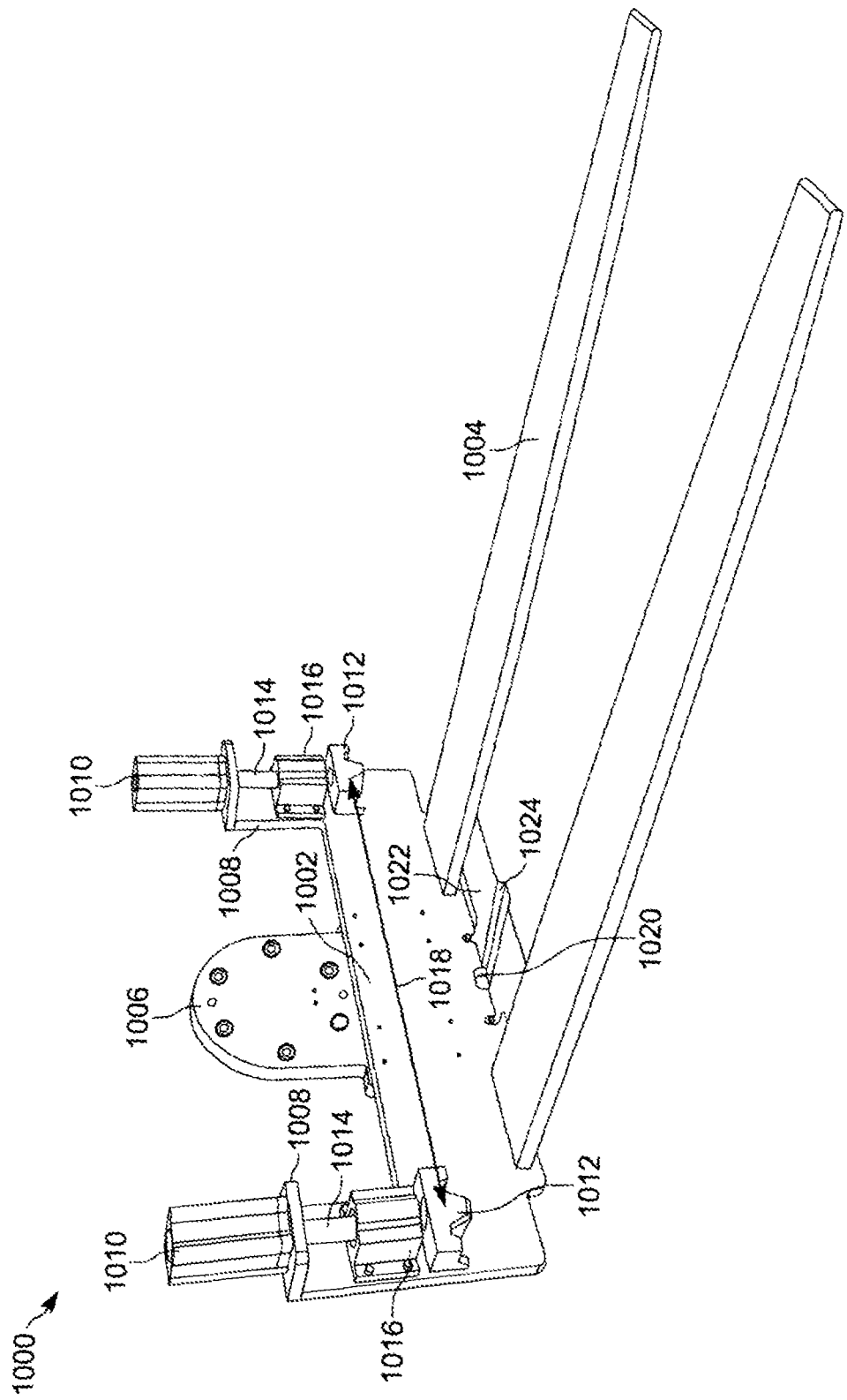
Figure 10B:
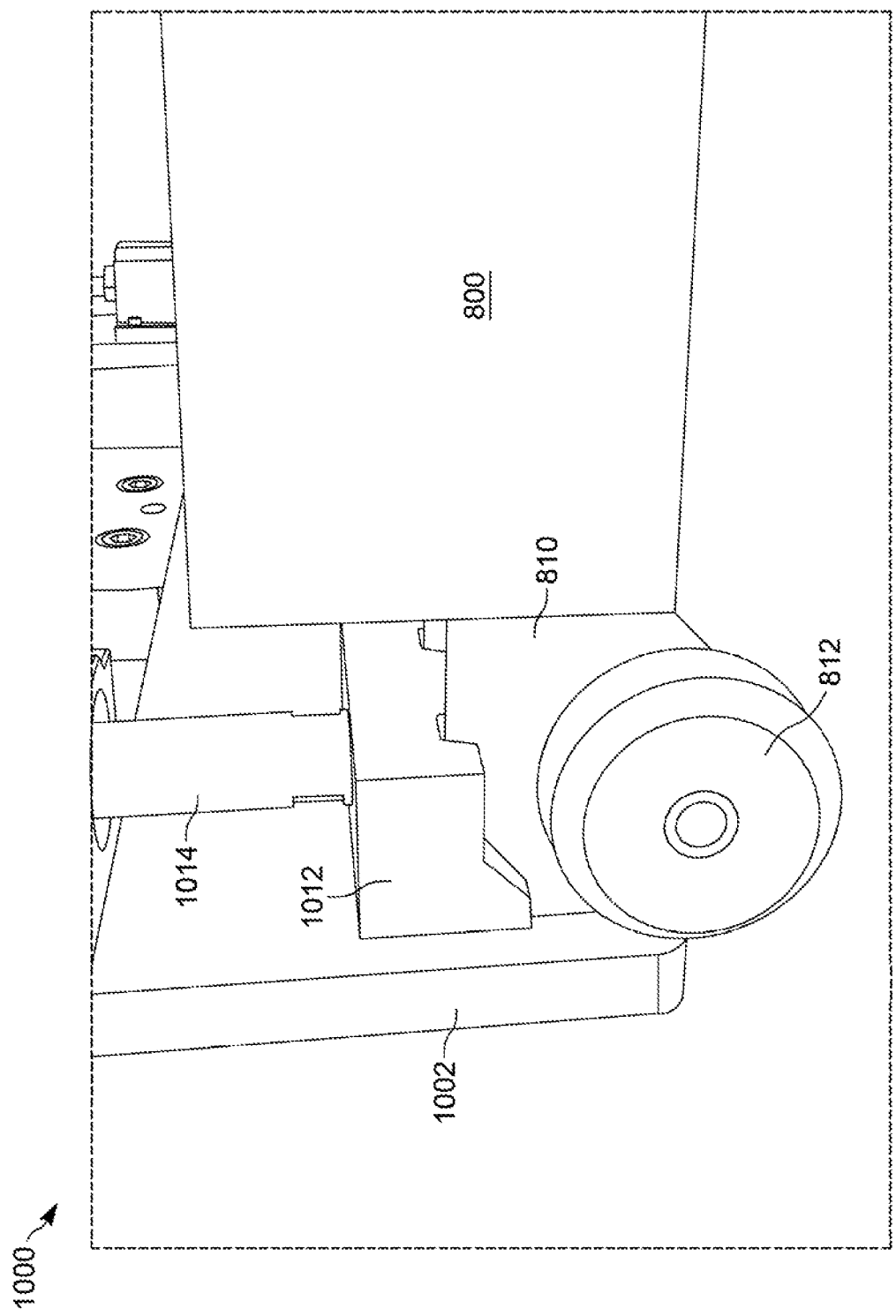
Figure 10C:
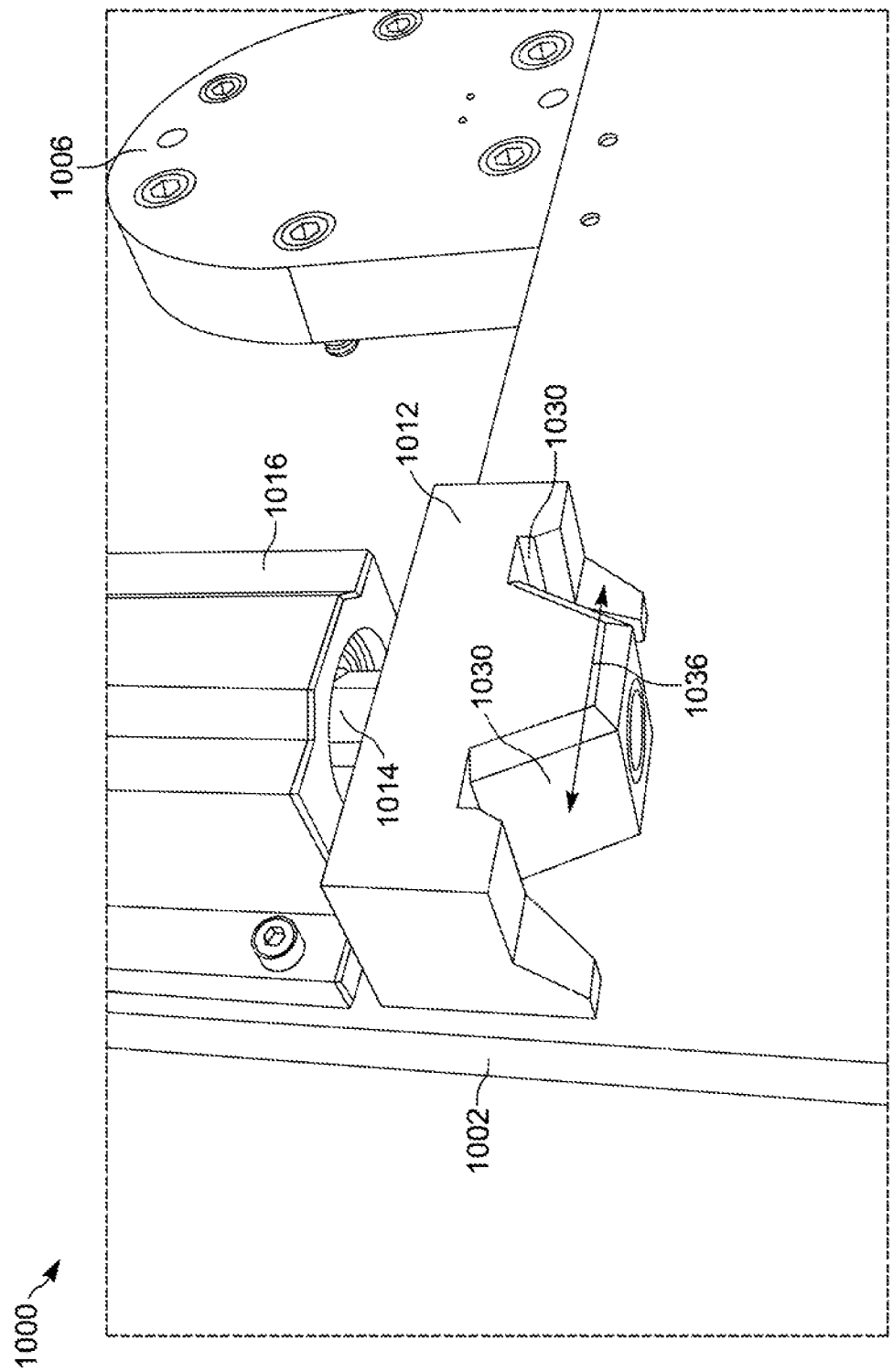
Figure 10D:
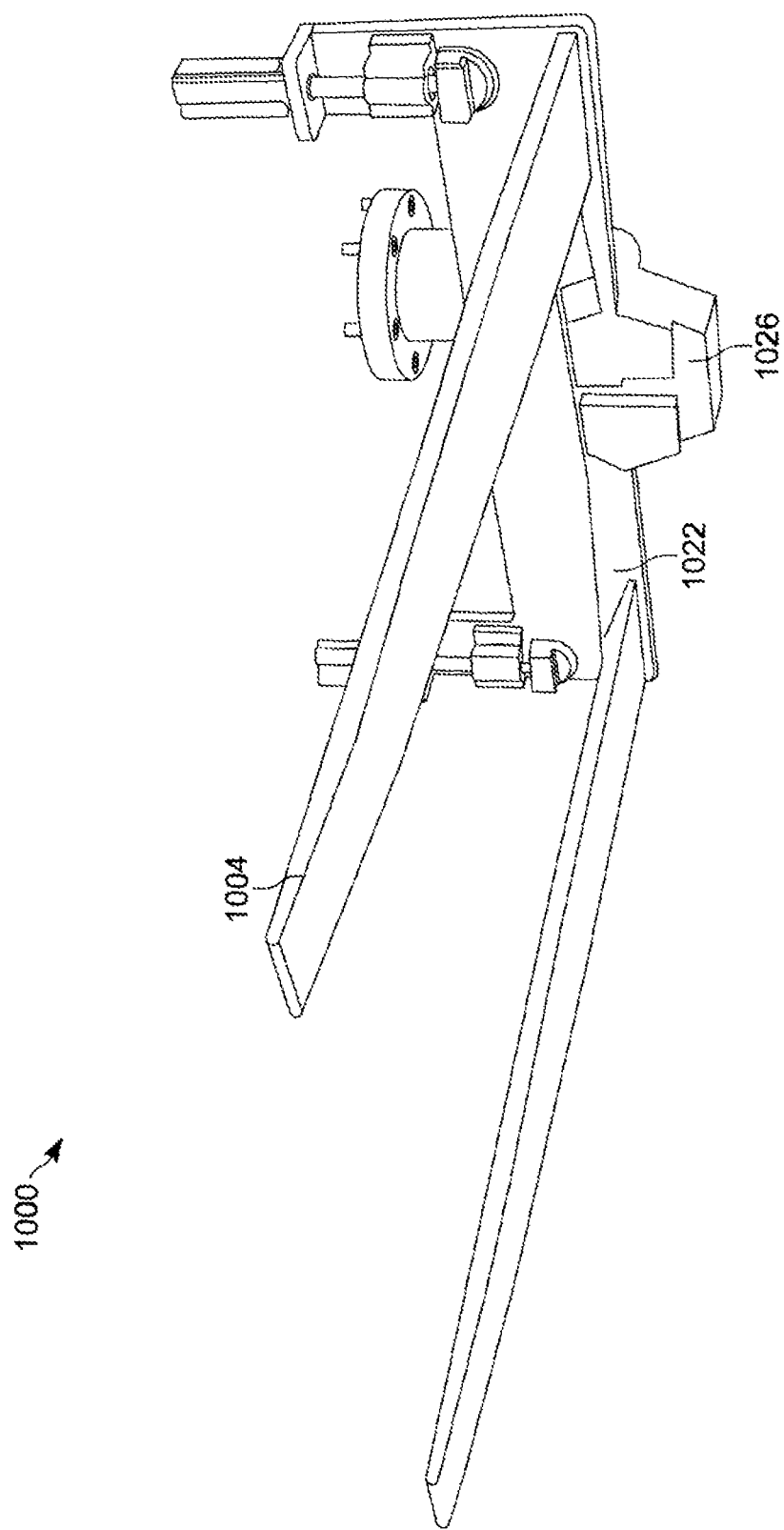
Figure 10E:
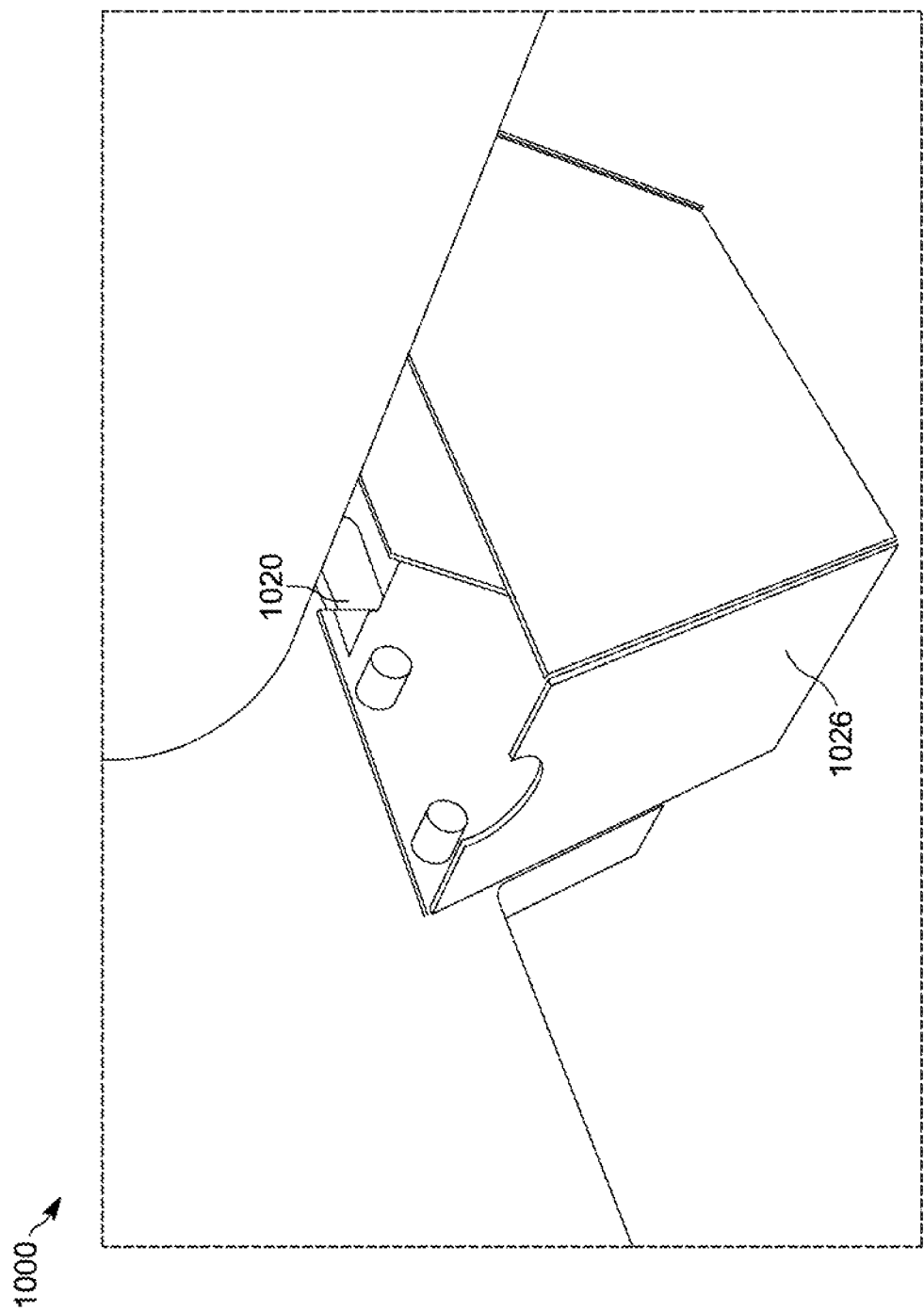

As shown in FIG. 9B, the robot controller 912 comprises a processor 922, a memory 924, an input/output interface 926, a communications interface 928, and a system bus 930, in accordance with some embodiments. The processor 922 may comprise any processing circuitry operative to control the operations and performance of the articulated robot 902 of the tray-handling system 900. In various aspects, the processor 922 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor 922 also may be implemented by a controller, a microcontroller, an application specific integrated circuit (ASIC), a field programmable gate array (FPGA), a programmable logic device (PLD), and so forth.

In various aspects, the processor 922 may be arranged to run an operating system (OS) and various applications. Examples of an OS comprise, for example, operating systems generally known under the trade name of Apple OS, Microsoft Windows OS, Android OS, and any other proprietary or open source OS. Examples of applications comprise, for example, a telephone application, a camera (e.g., digital camera, video camera) application, a browser application, a multimedia player application, a gaming application, a messaging application (e.g., email, short message, multimedia), a viewer application, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in the memory 924.

In some embodiments, the memory 924 may comprise any machine-readable or computer-readable media capable of storing data, including both volatile/non-volatile memory and removable/non-removable memory. The memory 924 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the robot controller 912 of the tray-handling system 900.

For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory 924 may contain an instruction set, in the form of a file for executing a method of generating one or more timing libraries as described herein. The instruction set may be stored in any acceptable form of machine-readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processor.

In some embodiments, the I/O interface 926 may comprise any suitable mechanism or component to enable a user to provide input to the robot controller 912 of the tray-handling system 900 and the robot controller 912 to provide output to the user. For example, the I/O interface 926 may comprise any suitable input mechanism, including but not limited to, a button, keypad, keyboard, click wheel, touch screen, or motion sensor. In some embodiments, the I/O interface 926 may comprise a capacitive sensing mechanism, or a multi-touch capacitive sensing mechanism (e.g., a touchscreen).

In some embodiments, the I/O interface 926 may comprise a visual peripheral output device for providing a display visible to the user. For example, the visual peripheral output device may comprise a screen such as, for example, a Liquid Crystal Display (LCD) screen, incorporated into the robot controller 912 of the tray-handling system 900. As another example, the visual peripheral output device may comprise a movable display or projecting system for providing a display of content on a surface remote from the robot controller 912 of the tray-handling system 900. In some embodiments, the visual peripheral output device can comprise a coder/decoder, also known as a Codec, to convert digital media data into analog signals. For example, the visual peripheral output device may comprise video Codecs, audio Codecs, or any other suitable type of Codec.

The visual peripheral output device also may comprise display drivers, circuitry for driving display drivers, or both. The visual peripheral output device may be operative to display content under the direction of the processor. For example, the visual peripheral output device may be able to play media playback information, application screens for applications implemented on the robot controller 912 of the tray-handling system 900, information regarding ongoing communications operations, information regarding incoming communications requests, or device operation screens, to name only a few.

In some embodiments, the communications interface 928 may comprise any suitable hardware, software, or combination of hardware and software that is capable of coupling the robot controller 912 of the tray-handling system 900 to one or more networks and/or additional devices. The communications interface 928 may be arranged to operate with any suitable technique for controlling information signals using a desired set of communications protocols, services or operating procedures. The communications interface 928 may comprise the appropriate physical connectors to connect with a corresponding communications medium, whether wired or wireless.

Systems and methods of communication comprise a network, in accordance with some embodiments. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery such as a circuit generating system, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fiber Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 928 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface may comprise a wireless interface comprising one or more antennas, transmitters, receivers, transceivers, amplifiers, filters, control logic, and so forth.

In various embodiments, the communications interface 928 may provide voice and/or data communications functionality in accordance a number of wireless protocols. Examples of wireless protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electromagnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

The system bus 930 couples the processor 922, the memory 924, the I/O interface 926, and the communication interface 928 to one another, as necessary. The system bus 930 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MCA), Extended ISA (EISA), Intelligent Drive Electronics (IDE), VESA Local Bus (VLB), Personal Computer Memory Card International Association (PCM-CIA) Bus, Small Computer System Interface (SCSI) or other proprietary bus, or any custom bus suitable for computing device applications.

FIGS. 10A-10F illustrate exemplary perspective views of a fork-type attachment 1000 for the articulated robot 902 in the tray-handling system 900, in accordance with some embodiments of the invention. In some embodiments, the attachment 1000 is configured to secure a cart 112 during a transfer process. In the illustrated embodiments, the attachment 1000 comprises a support frame 1002 and a pair of load forks 1004 mounted on and extending outwardly from the support frame 1002. In some embodiments, the support frame 1002 is mounted on a base 1006, which allows the attachment 1000 to be mounted on a segment of the articulated robot 902. In some embodiments, the support frame 1002 comprises two extensions 1008 at two opposite ends of the supporting frame 1002. In some embodiments, each of the two extensions 1008 supports a linear motor 1010 and a ball screw 1016. In some embodiments, a shaft 1014 is guided by the ball screw 1016 so as to transfer a rotation motion of the shaft 1014 to a linear motion of a head 1012 attached at a lower end of each shaft 1014.

In some embodiments, a first distance 1018 between the two heads 1012 is determined according to a second distance between two staples 810 on a cart 112 so as to allow the two heads 1012 to couple to the two staples 810 on the cart 112. In some embodiments, each of the two heads 1012 comprises two notches 1030, which are separated by a third distance 1036, wherein the third distance 1036 is determined by a width 812 of the staples 810 on the cart 112. As illustrated in FIG. 10F, in some embodiments, each of the two heads 1012 comprises a latch 1032 with a width 1034 which is smaller than the width of the staples 810. In some embodiments, the latch 1032 is separated from the support frame 1002 by a fourth distance 1036, wherein the fourth distance 1036 is greater than a thickness 814 of the staples 810.

In some embodiments, the attachment 1000 further comprises a liquid collection assembly. In some embodiments, the liquid collection assembly comprises a base plate 1022 with a trench 1024, wherein the base plate 1022 is coupled to the support frame 1002 on a first side. In some embodiments, the position of the trench 1024 on the base plate 1022 is determined according to a position of the tray drain insert 700 in a tray on the cart 112, as described above, so as to allow a collection of irrigation liquid draining from the tray. In some embodiments, the liquid collection assembly further comprises a reservoir 1026. In some embodiments, the reservoir 1026 is attached to the support frame 1002 on a second side. In some embodiments, the reservoir 1026 is configured to temporarily store the irrigation liquid collected from the trench 1024 through an opening 1020 on the support frame 1002. In some embodiments, the liquid collection assembly comprises stainless steel.

Figure 11:
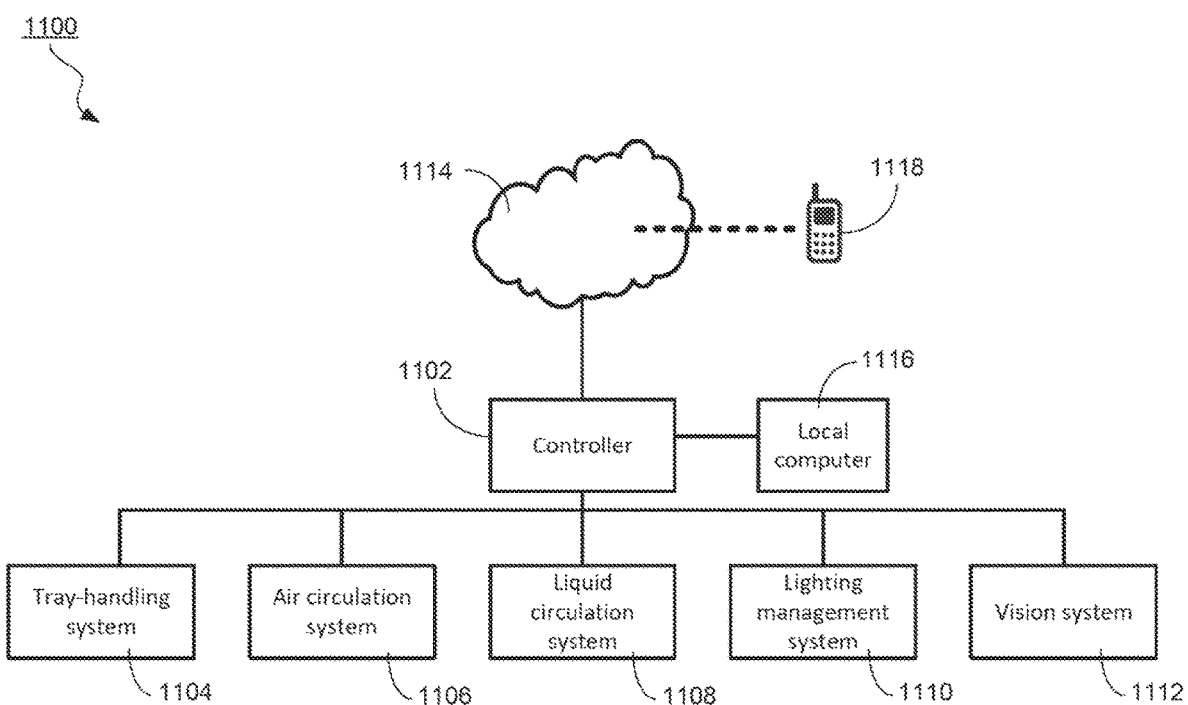
FIG. 11 illustrates an exemplary block diagram of a control system 1100 in an indoor farming module 100, in accordance with some embodiments of the invention.

FIG. 11 illustrates an exemplary block diagram of a control system 1100 in an indoor farming module 100, in accordance with some embodiments of the invention. It is noted that the control system 1100 is merely an example, and is not intended to limit the invention. Accordingly, it is understood that additional functional blocks may be provided in or coupled to the control system 1100 of FIG. 11, and that some other functional blocks may be omitted or only briefly described herein. It should be also noted that the functionalities provided in each of the components and modules of the control system 1100 can be combined or separated into one or more modules.

In some embodiments, the control system 1100 comprises a controller 1102. In some embodiments, the controller 1102 is configured to regulate environmental parameters of the indoor farming module 100, and coordinate a tray loading/unloading process. In some embodiments, the control system 1100 further comprises five sub-systems, including a tray-handling system 1104, an air circulation system 1106, a liquid circulation system 1108, a lighting management system 1110, and a vision system 1112.

In the illustrated embodiments, the tray-handling system 1104 is designed for automatically loading and unloading carts 112 through a first end of the indoor farming module 100. In the illustrated embodiment, the tray-handling system 1104 comprises an articulated robot 902 and a robot controller 904, as described above. In some embodiments, the tray-handling system 1104 is configured to transfer a predetermined cart from the chassis 104 in the indoor farming module 100 to a predetermined position (e.g., a storage rack 906). In some embodiments, when inserting new crops into the indoor farming module 100, the tray-handling system 1104 is configured to transfer a predetermined cart from the storage rack 906 to the chassis 104 of the indoor farming module 100.

In some embodiments, the air circulation system 1106 comprises an air blowing unit 206, an air conditioning unit 208, an air dehumidifying unit 210, and a drop ceiling 212, as described above. In some embodiments, the air blowing unit 206, the air conditioning unit 208, the at least one dehumidifying unit 210, and the drop ceiling 212 are configured to provide effective regulation of humidity, CO2 level, air flow and temperature for the plurality of plants on each of the plurality of carts 112 at different tiers 106 of the chassis 104 in the grow zone 202 of the container compartment 102.

In some embodiments, the liquid circulation system 1108 comprises a plurality of liquid supply conduits 506, a plurality of liquid return conduits 508, a plurality of drainage conduits 512, and a plurality of liquid distribution tube assembly 510, as described above. In further embodiments, the liquid circulation system 1108 can include a drainage liquid reservoir, at least one filter, a liquid supply reservoir, a plurality of nutrient reservoirs, a temperature control unit, a pH control unit, an oxygen-level control unit (not shown), each operatively coupled to the plurality of liquid supply conduits 506 and/or the plurality of liquid return conduits 508 for controlling the contents and characteristics (e.g., temperature, pH, etc.) of the liquid flowing through the liquid circulation system 1108. In some embodiments, the liquid circulation system 1108 regulates a nutrient level, an oxygen level, a pH level, a temperature and a particle level in the irrigation liquid to support the growth of plants in the trays of the indoor farming module 100.

In the illustrated embodiment, the lighting management system 1110 comprises a plurality of lighting modules and each of the plurality of lighting modules comprises at least one of the following photon sources: an incandescent light, a fluorescent light, a halogen light, a high pressure sodium light, a plasma light, and a light-emitting diode (LED) light, so as to provide photons for the photosynthetic reactions in plants. In some embodiments, the photon sources is selected according to a desired light spectrum for the plants. In some embodiments, the lighting management system 1110 further comprises at least one power supply to power the plurality of lighting modules. In some embodiments, the at least one power supply can be controlled so as to regulate the light intensity, uniformity and light spectrum to provide a desired illumination to the plants in the indoor farming module 100.

In some embodiments, the control system 1100 further comprises a vision system 1112. In some embodiments, the vision system 1112 comprises at least one camera and at least one light source. In some embodiments, the vision system 1112 is configured outside of the indoor farming module 100 for security purposes. In some embodiments, the vision system 1112 can be also configured in the indoor farming module 100 for monitoring the growth of the plants.

The controller 1102 may comprise a processor, a memory, an input/output interface, a communications interface, and a system bus. The processor may comprise any processing circuitry operative to control the operations and performance of the controller 1102. In various aspects, the processor may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor also may be implemented by a controller, a microcontroller, an application specific integrated circuit (ASIC), a field programmable gate array (FPGA), a programmable logic device (PLD), and so forth.

In various aspects, the processor may be arranged to run an operating system (OS) and various applications. Examples of an OS comprise, for example, operating systems generally known under the trade name of Apple OS, Microsoft Windows OS, Android OS, and any other proprietary or open source OS. Examples of applications comprise, for example, a telephone application, a camera (e.g., digital camera, video camera) application, a browser application, a multimedia player application, a gaming application, a messaging application (e.g., email, short message, multimedia), a viewer application, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in the memory.

In some embodiments, the memory may comprise any machine-readable or computer-readable media capable of storing data, including both volatile/non-volatile memory and removable/non-removable memory. The memory may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the controller 1102.

For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory may contain an instruction set, in the form of a file for executing a method of generating one or more timing libraries as described herein. The instruction set may be stored in any acceptable form of machine-readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processor.

In some embodiments, the I/O interface may comprise any suitable mechanism or component to at least enable a user to provide input to the controller 1102 and the controller 1102 to provide output to the user. For example, the I/O interface may comprise any suitable input mechanism, including but not limited to, a button, keypad, keyboard, click wheel, touch screen, or motion sensor. In some embodiments, the I/O interface may comprise a capacitive sensing mechanism, or a multi-touch capacitive sensing mechanism (e.g., a touchscreen).

In some embodiments, the I/O interface may comprise a visual peripheral output device for providing a display visible to the user. For example, the visual peripheral output device may comprise a screen such as, for example, a Liquid Crystal Display (LCD) screen, incorporated into the controller 1102. As another example, the visual peripheral output device may comprise a movable display or projecting system for providing a display of content on a surface remote from the controller 1102. In some embodiments, the visual peripheral output device can comprise a coder/decoder, also known as a Codec, to convert digital media data into analog signals. For example, the visual peripheral output device may comprise video Codecs, audio Codecs, or any other suitable type of Codec.

The visual peripheral output device also may comprise display drivers, circuitry for driving display drivers, or both. The visual peripheral output device may be operative to display content under the direction of the processor. For example, the visual peripheral output device may be able to play media playback information, application screens for applications implemented on the controller 1102, information regarding ongoing communications operations, information regarding incoming communications requests, or device operation screens, to name only a few.

In some embodiments, the communications interface may comprise any suitable hardware, software, or combination of hardware and software that is capable of coupling the controller 1102 to one or more networks and/or additional devices. The communications interface may be arranged to operate with any suitable technique for controlling information signals using a desired set of communications protocols, services or operating procedures. The communications interface may comprise the appropriate physical connectors to connect with a corresponding communications medium, whether wired or wireless.

Systems and methods of communication comprise a network, in accordance with some embodiments. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery such as a circuit generating system 404, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fiber Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface may comprise a wireless interface comprising one or more antennas, transmitters, receivers, transceivers, amplifiers, filters, control logic, and so forth.

In various embodiments, the communications interface may provide voice and/or data communications functionality in accordance a number of wireless protocols. Examples of wireless protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electromagnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, the controller 1102 may comprise a system bus that couples various system components including the processor, the memory, and the I/O interface. The system bus can be any of several types of bus structure (s) including a memory bus or memory controller, a peripheral bus or external bus, and/or a local bus using any variety of available bus architectures including, but not limited to, 9-bit bus, Industrial Standard Architecture (ISA), Micro-Channel Architecture (MCA), Extended ISA (EISA), Intelligent Drive Electronics (IDE), VESA Local Bus (VLB), Personal Computer Memory Card International Association (PCMCIA) Bus, Small Computer System Interface (SCSI) or other proprietary bus, or any custom bus suitable for computing device applications.

In some embodiments, the controller 1102 is further coupled to a local computer 1116 and further coupled to a remote computer 1118 through a communications network 1114 (e.g., the Internet). In some embodiments, the remote computer 1118 is a mobile device. In alternative embodiments, the remote computer 1118 comprises at least one server computer coupled to a database storing environmental parameters and other data and instructions for analyzing data information provided by each of the sub-systems 1104, 1106, 1108, 1110 and 1112 and thereafter provide further instructions to the controller 1102 and/or the local computer 1116 for automatically monitoring and controlling the operation of the indoor farming module 100 described above.

Figure 12A:
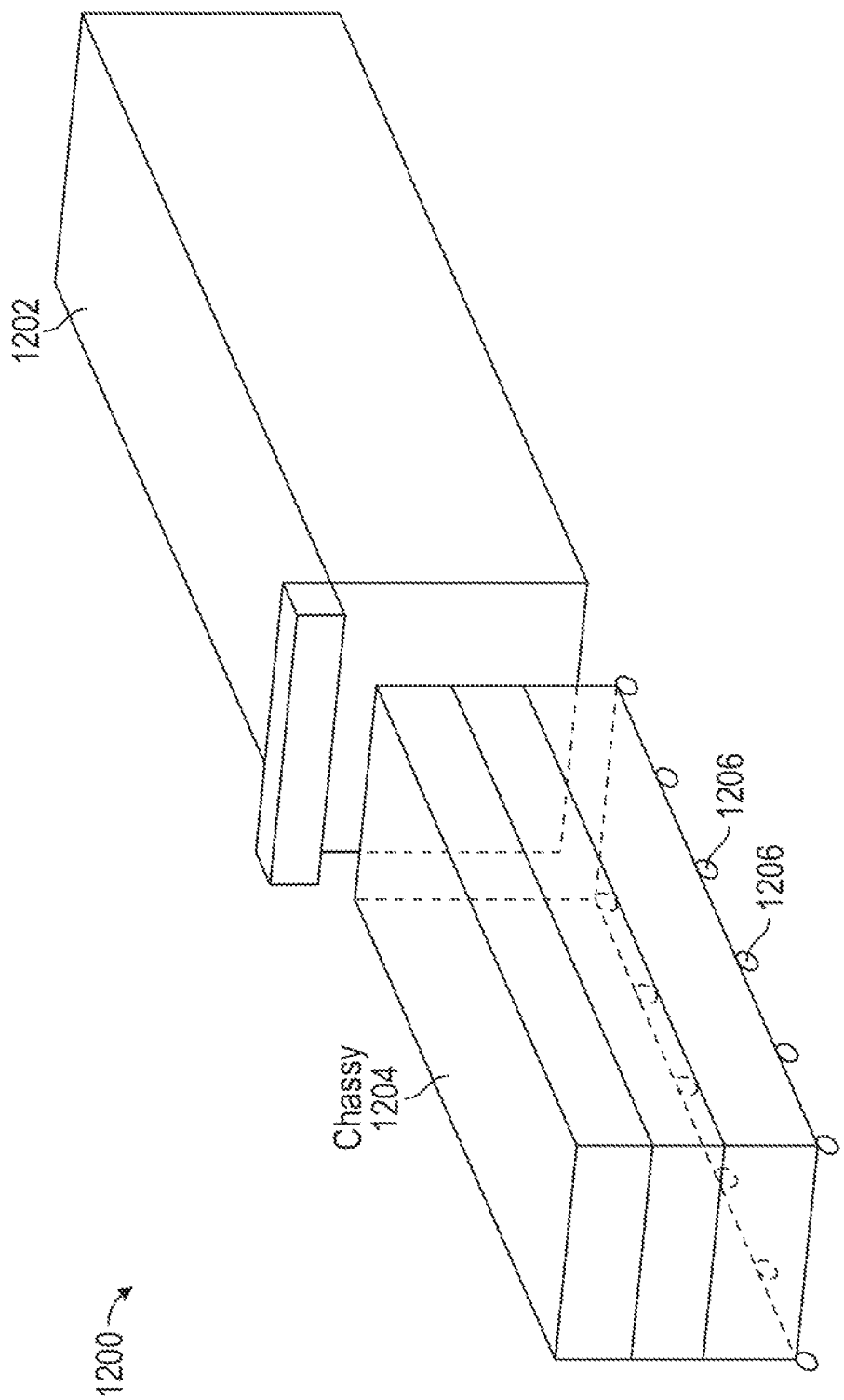
FIGS. 12A-12B illustrate perspective views of an indoor farming module 1200, in accordance with some embodiments of the invention.
Figure 12B:
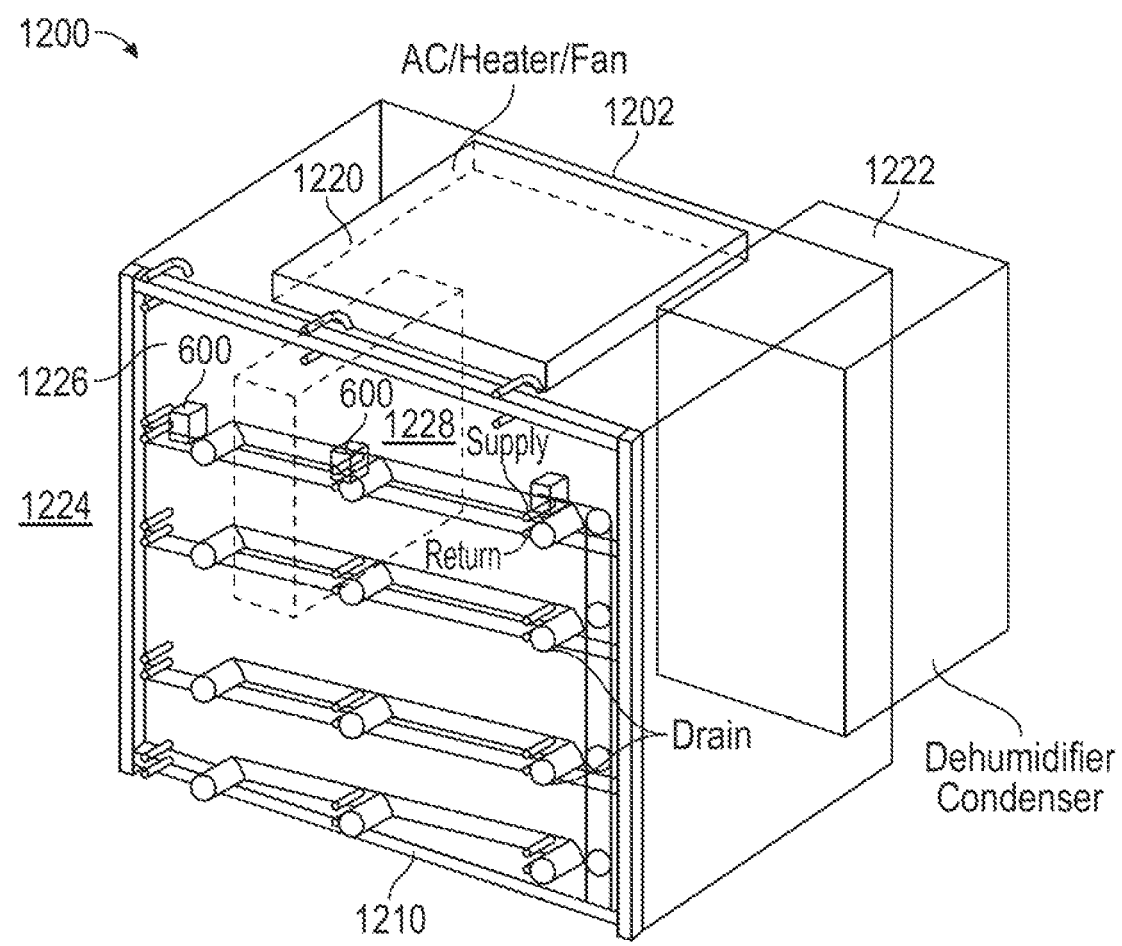

FIGS. 12A-12B illustrate perspective views of an indoor farming module 1200, in accordance with some embodiments of the invention. In some embodiments, the indoor farming module 1200 comprises a container 1202 and a chassis 1204. In the illustrated embodiments, the chassis 1204 is manufactured separately from the container 1202. In some embodiments, the chassis 1204 comprises a plurality of vertical and horizontal frame members and a plurality of wheels so that the chassis 1204 is transferrable into or out of the container compartment 1202. In some embodiments, the chassis 1204 further comprises a plurality of liquid supply conduits, a plurality of liquid return conduits, a plurality of liquid distribution tube assemblies, a plurality of drainage conduits, and plurality of lighting apparatus, as described above.

In some embodiments, the container 1202 comprises an air blowing unit 1220, an air dehumidifying unit 1222, and a control unit 1224. In some embodiments, the air blowing unit 1220 is coupled to a drop ceiling (not shown), as discussed in FIGS. 2-3. In some embodiments, a rack 1210 is mounted on walls on two long sides of the container compartment 1202. In some embodiments, the rack 1210 comprises a plurality of stepper motor assemblies 600 for receiving the plurality of corresponding liquid return conduits on the chassis 1204, a plurality of liquid supply slots 1226 for receiving the plurality of corresponding liquid supply conduits on the chassis 1204, and a plurality of drainage slots 1228 for receiving the plurality of corresponding drainage conduits on the chassis 1204. In some embodiments, the container compartment 1202 further comprises anchor points on walls and a floor to secure the chassis 1204 when loaded into the container compartment 1202.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the invention should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the invention.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein.

The invention claimed is:

1. An indoor farming module comprising:
a compartment comprising a plurality of walls, and a ceiling defining a grow zone;
an air circulation system comprising an air blowing unit and an air conditioning unit configured to provide an airflow into the grow zone;
a chassis comprising a plurality of vertical frame members and a plurality of horizontal frame members that form a plurality of tiers, each tier vertically spaced apart from an adjacent tier;
a cart guiding system positioned on each tier;
a plurality of carts positioned on each tier so as to interact with the cart guiding system; and
a tray positioned in each of the plurality of carts, the tray configured to retain a plurality of plants;
wherein each cart of the plurality of carts is movable within the grow zone to permit the plurality of plants to be loaded and unloaded from the chassis.

2. The indoor farming module of claim 1, wherein the cart guiding systems comprises a pair of guide rails positioned on each tier of the chassis.

3. The indoor farming module of claim 1, wherein each cart of the plurality of carts is coupled to an adjacent cart on each tier.

4. The indoor farming module of claim 1, wherein each cart of the plurality of carts comprises a cart coupler positioned on one end of the cart, the cart coupler connecting each cart to an adjacent cart when lowered into position on the pair of guide rails.

5. The indoor farming module of claim 1, wherein each cart of the plurality of carts is moved along the pair of guide rails from being contacted by an adjacent cart.

6. The indoor farming module of claim 4, further comprising a tray handling system comprising an attachment configured to releasably connect to each cart of the plurality of carts to load and unload each cart from the chassis.

7. The indoor farming module of claim 6, wherein the attachment is configured to connect to a pair of cart couplers positioned on one end of each cart of the plurality of carts.

8. The indoor farming module of claim 2, wherein the pair of guide rails is one of a plurality of pairs of guide rails positioned on each tier to form a plurality of rows of carts on each tier.

9. The indoor farming module of claim 2, wherein each cart of the plurality of carts comprises a plurality of wheels configured to support the cart on the pair of guide rails.

10. The indoor farming module of claim 2, wherein a horizontal frame member of the plurality of horizontal frame members supports a liquid circulation assembly, a lighting assembly, and the pair of guide rails at each tier of the plurality of tiers.

11. The indoor farming module of claim 10, wherein the horizontal frame member also supports a leaf guard at each tier of the plurality of tiers.

12. The indoor farming module of claim 11, wherein the leaf guard is vertically positioned above the tray to guide plant material from the plurality of plants into the tray or cart.

13. The indoor farming module of claim 2, further comprising a liquid circulation assembly comprising a liquid supply conduit, a liquid return conduit, a liquid distribution tube assembly, and a drainage conduit.

14. The indoor farming module of claim 9, wherein the liquid supply conduit is coupled to one of the plurality of horizontal frame members forming each tier to provide liquid to a plurality of trays on each tier.

15. The indoor farming module of claim 9, wherein the liquid return conduit is coupled to the liquid distribution tube assembly, the liquid distribution tube assembly movable from an engaged position in which the liquid distribution tube assembly is engaged with a corresponding tray to provide irrigation liquid to the corresponding tray, to a disengaged position in which the liquid distribution tube assembly is moved away from the corresponding cart to permit movement of the corresponding cart along the pair of guide rails.

16. The indoor farming module of claim 15, wherein the liquid distribution tube assembly is moved from the engaged position to the disengaged position by rotating the liquid return conduit.

17. The indoor farming module of claim 16, wherein the liquid distribution tube assembly comprises a liquid distribution nozzle and an aeration unit.

18. The indoor farming module of claim 13, wherein the tray comprises a drain opening fluidly coupled to the drain conduit of the liquid circulation assembly to allow drainage liquid to be collected.

19. The indoor farming module of claim 1, wherein the farming module compartment forms a rectangular box and the chassis is configured to be loaded with the plurality of carts from one end of the rectangular box.

20. The indoor farming module of claim 1, wherein each tier of the plurality of tiers is positioned horizontally in the grow zone parallel to an adjacent tier.

21. The indoor farming module of claim 1, wherein the chassis comprises a plurality of wheels so that the chassis is transferrable into and out of the farming module compartment.

22. An indoor farming module comprising:
- a compartment comprising a plurality of walls, and a ceiling defining a grow zone;
- an air circulation system comprising an air blowing unit and an air conditioning unit configured to provide an airflow into the grow zone;
- a chassis comprising a plurality of vertical frame members and a plurality of horizontal frame members that form a plurality of tiers, each tier vertically spaced apart from an adjacent tier;
- one or more cart guiding rails positioned on each tier;
- a plurality of carts positioned on each tier; and
- a tray positioned in each of the plurality of carts, the tray configured to retain a plurality of plants;
- wherein each cart of the plurality of carts is movable within the grow zone to permit the plurality of plants to be loaded and unloaded from the chassis.

* * * * *